US008103553B2

(12) United States Patent
Bullock

(10) Patent No.: US 8,103,553 B2
(45) Date of Patent: Jan. 24, 2012

(54) METHOD FOR MAKING MONEY ON INTERNET NEWS SITES AND BLOGS

(76) Inventor: Roddy McKee Bullock, Milford, OH (US)

( * ) Notice: Subject to any disclaimer, the term of this patent is extended or adjusted under 35 U.S.C. 154(b) by 325 days.

(21) Appl. No.: 12/574,679

(22) Filed: Oct. 6, 2009

(65) Prior Publication Data

US 2011/0082757 A1    Apr. 7, 2011

Related U.S. Application Data

(63) Continuation-in-part of application No. 12/479,780, filed on Jun. 6, 2009, now Pat. No. 8,065,193, and a continuation-in-part of application No. 12/492,132, filed on Jun. 25, 2009.

(51) Int. Cl.
*G06Q 30/00* (2012.01)
*G06F 17/30* (2006.01)
(52) U.S. Cl. ..................... 705/26.1; 705/27.1
(58) Field of Classification Search ............ 705/26.1
See application file for complete search history.

(56) References Cited

U.S. PATENT DOCUMENTS

| | | | |
|---|---|---|---|
| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |
| 5,291,598 A | 3/1994 | Grundy |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,666,415 A | 9/1997 | Kaufman |
| 5,677,955 A | 10/1997 | Doggett et al. |
| 5,745,879 A | 4/1998 | Wyman |
| 5,754,763 A | 5/1998 | Bereiter |

(Continued)

FOREIGN PATENT DOCUMENTS

AU    678985    6/1997

(Continued)

OTHER PUBLICATIONS

EpicLaunch—Check Out TalkAhead—Sponsored Comments—http://epiclaunch.com/sponsored-comment/ (Oct. 5, 2009).*

(Continued)

*Primary Examiner* — William Allen
*Assistant Examiner* — Kathleen G Palavecino
(74) *Attorney, Agent, or Firm* — Roddy M. Bullock

(57) ABSTRACT

A method for making an online posted comment more conspicuous relative to other online posted comments. The method can include the steps of publishing internet content online by an internet content provider; providing with the published content a section for recording and posting reader comments; viewing by a reader the published internet content; providing to the reader an option of posting for free a default format comment or posting for a fee a comment made distinctive relative to a default format comment; recording, by the reader, a comment; paying, by the reader, the fee for making the comment distinctive relative to a default format comment; and posting the reader's distinctive comment in the comment section, wherein the posted comment lacks an indication of the time of posting. The fee for distinctiveness transaction can also be implemented by use of an online auction.

14 Claims, 6 Drawing Sheets

U.S. PATENT DOCUMENTS

| | | | |
|---|---|---|---|
| 5,790,664 A | 8/1998 | Coley et al. | |
| 5,793,028 A | 8/1998 | Wagener et al. | |
| 5,826,245 A | 10/1998 | Sandberg-Diment | |
| 5,903,721 A | 5/1999 | Sixtus | |
| 5,903,878 A | 5/1999 | Talati et al. | |
| 5,925,127 A | 7/1999 | Ahmad | |
| 5,960,411 A | 9/1999 | Hartman et al. | |
| 5,974,150 A | 10/1999 | Kaish et al. | |
| 6,009,401 A | 12/1999 | Horstmann | |
| 6,044,471 A | 3/2000 | Colvin | |
| 6,092,053 A | 7/2000 | Boesch et al. | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,247,129 B1 | 6/2001 | Keathley et al. | |
| 6,269,361 B1 * | 7/2001 | Davis et al. | 1/1 |
| 6,270,011 B1 | 8/2001 | Gottfried | |
| 6,294,793 B1 | 9/2001 | Brunfeld et al. | |
| 6,327,578 B1 | 12/2001 | Linehan | |
| 6,330,550 B1 | 12/2001 | Brisebois et al. | |
| 6,330,670 B1 | 12/2001 | England et al. | |
| 6,449,645 B1 | 9/2002 | Nash | |
| 6,536,005 B1 | 3/2003 | Augarten | |
| 6,629,079 B1 | 9/2003 | Spiegel et al. | |
| 6,675,153 B1 | 1/2004 | Cook et al. | |
| 6,785,825 B2 | 8/2004 | Colvin | |
| 6,859,793 B1 | 2/2005 | Lambiase | |
| 6,920,567 B1 | 7/2005 | Doherty et al. | |
| 6,957,334 B1 | 10/2005 | Goldstein et al. | |
| 6,976,009 B2 | 12/2005 | Tadayon et al. | |
| 7,007,840 B2 | 3/2006 | Davis | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,089,208 B1 | 8/2006 | Levchin et al. | |
| 7,139,732 B1 | 11/2006 | Desenberg | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,209,970 B1 | 4/2007 | Everson et al. | |
| 7,249,093 B1 | 7/2007 | King | |
| 7,272,728 B2 | 9/2007 | Pierson et al. | |
| 7,275,685 B2 | 10/2007 | Gray et al. | |
| 7,318,048 B1 | 1/2008 | King | |
| 7,319,987 B1 | 1/2008 | Hoffman et al. | |
| 7,327,280 B2 | 2/2008 | Bachelder et al. | |
| 7,331,518 B2 | 2/2008 | Rable | |
| 7,337,147 B2 | 2/2008 | Chen et al. | |
| 7,343,297 B2 | 3/2008 | Bergler et al. | |
| 7,346,552 B1 | 3/2008 | Salzinger et al. | |
| 7,356,502 B1 | 4/2008 | LaBadie et al. | |
| 7,376,583 B1 | 5/2008 | Rolf | |
| 7,383,231 B2 | 6/2008 | Gupta et al. | |
| 7,426,530 B1 | 9/2008 | Rosko et al. | |
| 7,433,452 B2 | 10/2008 | Taylor et al. | |
| 7,463,945 B2 | 12/2008 | Kiesel et al. | |
| 7,505,935 B2 | 3/2009 | Mendiola et al. | |
| 7,617,125 B1 | 11/2009 | Light et al. | |
| 7,620,636 B2 | 11/2009 | Fasciano | |
| 7,653,899 B1 | 1/2010 | Lindahi et al. | |
| 7,693,796 B2 | 4/2010 | Light et al. | |
| 2001/0034712 A1 | 10/2001 | Colvin | |
| 2001/0042051 A1 | 11/2001 | Barrett et al. | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0147690 A1 | 10/2002 | Tam et al. | |
| 2002/0161718 A1 | 10/2002 | Coley et al. | |
| 2003/0004806 A1 | 1/2003 | Vaitekunas | |
| 2003/0065918 A1 | 4/2003 | Willey | |
| 2003/0130900 A1 | 7/2003 | Telford et al. | |
| 2003/0172035 A1 | 9/2003 | Cronce et al. | |
| 2004/0015413 A1 | 1/2004 | Abu-Hejleh et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0187018 A1 | 9/2004 | Owen et al. | |
| 2004/0243477 A1 | 12/2004 | Mathai et al. | |
| 2005/0015445 A1 | 1/2005 | Chudnovsky et al. | |
| 2005/0044014 A1 | 2/2005 | Tilis et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2005/0273503 A1 | 12/2005 | Carr et al. | |
| 2005/0278542 A1 | 12/2005 | Pierson et al. | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0200390 A1 * | 9/2006 | Ananian | 705/27 |
| 2006/0253340 A1 | 11/2006 | Levchin et al. | |
| 2006/0265337 A1 | 11/2006 | Wesinger, Jr. | |
| 2006/0271438 A1 * | 11/2006 | Shotland et al. | 705/14 |
| 2006/0282511 A1 | 12/2006 | Takano et al. | |
| 2007/0038646 A1 | 2/2007 | Thota | |
| 2007/0067215 A1 * | 3/2007 | Agarwal et al. | 705/14 |
| 2007/0168288 A1 | 7/2007 | Bozeman | |
| 2007/0170245 A1 | 7/2007 | Elbaum et al. | |
| 2007/0198422 A1 | 8/2007 | Prahlad et al. | |
| 2007/0203836 A1 | 8/2007 | Dodin | |
| 2007/0203846 A1 | 8/2007 | Kavuri et al. | |
| 2007/0203850 A1 | 8/2007 | Singh et al. | |
| 2007/0219917 A1 | 9/2007 | Liu et al. | |
| 2007/0282615 A1 | 12/2007 | Hamilton et al. | |
| 2008/0005282 A1 | 1/2008 | Gaedcke | |
| 2008/0016164 A1 | 1/2008 | Chandra | |
| 2008/0065552 A1 | 3/2008 | Elazar et al. | |
| 2008/0065649 A1 * | 3/2008 | Smiler | 707/10 |
| 2008/0082381 A1 | 4/2008 | Muller et al. | |
| 2008/0086423 A1 | 4/2008 | Waites | |
| 2008/0109363 A1 | 5/2008 | Fassett | |
| 2008/0126192 A1 * | 5/2008 | Patel et al. | 705/14 |
| 2008/0133488 A1 | 6/2008 | Bandaru et al. | |
| 2008/0147556 A1 | 6/2008 | Smith et al. | |
| 2008/0189153 A1 * | 8/2008 | Haldeman | 705/7 |
| 2008/0228578 A1 | 9/2008 | Mashinsky | |
| 2008/0319873 A1 | 12/2008 | Levchin et al. | |
| 2008/0319874 A1 | 12/2008 | Levchin et al. | |
| 2008/0319875 A1 | 12/2008 | Levchin et al. | |
| 2008/0319899 A1 | 12/2008 | Levchin et al. | |
| 2008/0320607 A1 | 12/2008 | Richardson | |
| 2009/0037982 A1 | 2/2009 | Wentker et al. | |
| 2009/0083383 A1 * | 3/2009 | Piper et al. | 709/206 |
| 2009/0083730 A1 | 3/2009 | Richardson | |
| 2009/0106119 A1 | 4/2009 | Mathai et al. | |
| 2009/0138975 A1 | 5/2009 | Richardson | |
| 2009/0265257 A1 | 10/2009 | Klinger et al. | |
| 2009/0265665 A1 | 10/2009 | Martiros | |
| 2009/0281948 A1 | 11/2009 | Carlson | |
| 2009/0292619 A1 | 11/2009 | Kagan et al. | |
| 2009/0307135 A1 | 12/2009 | Gupta et al. | |
| 2009/0313165 A1 | 12/2009 | Walter | |
| 2009/0319368 A1 | 12/2009 | Reardon et al. | |
| 2010/0017283 A1 * | 1/2010 | Hamilton et al. | 705/14.25 |
| 2010/0057552 A1 | 3/2010 | O'Leary et al. | |
| 2010/0070350 A1 * | 3/2010 | Paunikar et al. | 705/14.1 |
| 2010/0088231 A1 | 4/2010 | Eugenio | |
| 2010/0094878 A1 * | 4/2010 | Soroca et al. | 707/748 |
| 2010/0138294 A1 * | 6/2010 | Bussmann et al. | 705/14.49 |
| 2010/0217645 A1 * | 8/2010 | Jin et al. | 705/9 |
| 2010/0293221 A1 * | 11/2010 | Sidman et al. | 709/203 |
| 2010/0325040 A1 | 12/2010 | Etchegoyen | |
| 2010/0325711 A1 | 12/2010 | Etchegoyen | |
| 2010/0332400 A1 | 12/2010 | Etchegoyen | |

FOREIGN PATENT DOCUMENTS

| | | |
|---|---|---|
| EP | 1187077 A1 | 9/2000 |
| EP | 1637958 | 3/2006 |
| EP | 1637961 | 3/2006 |
| EP | 1670188 | 6/2006 |
| WO | WO 9220022 | 11/1992 |
| WO | WO 9301550 | 1/1993 |
| WO | WO 9535533 | 12/1995 |
| WO | WO 99/13424 A1 | 3/1999 |
| WO | WO 00/45349 A1 | 8/2000 |

| | | |
|---|---|---|
| WO | WO 0067095 | 11/2000 |
| WO | WO 2005104686 | 11/2005 |
| WO | WO2007060516 | 5/2007 |
| WO | WO2008013504 | 1/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |

OTHER PUBLICATIONS

Passive Data Link Layer 802.11 Wireless Device Driver Fingerprinting, Proceedings of USENIX Security '06, Jul. 31-Aug. 4, 2006, Vancouver, BC, British Columbia.

Williams, R. "A Painless Guide to CRC Error Detection Algorithms", Ver. 3, Aug. 19, 1993.

Angha, F. et al., "Securing Transportation Network Infrastructure with Patented Technology of Device Locking—Developed By Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

TalkAhead Sponsored Comments: Starting Conversations between Consumers and Marketers.
http://www.talkahead.com/.

ABECHTEL1, Would you pay to comment on a news site?, The Editor's Desk, Mar. 30, 2009, http://editdesk.wordpress.com/2009/03/30comments-pay.

NA, So you want to become a new member . . . , MetaFilter, Dec. 8, 2009 (may be date accessed), http://www.metafilter.com/newuser.mefi.

John Robinson, Penny for your thoughts?, The Editor's Log, Mar. 5, 2009, http://www.news-record.com/blog/56184/entry/58159.

\* cited by examiner

METHOD FOR MAKING MONEY ON INTERNET NEWS SITES AND BLOGS

CROSS-REFERENCE TO OTHER APPLICATIONS

This application is a continuation-in-part of U.S. Ser. No. 12/479,780, entitled Method for Making Money on the Internet, filed Jun. 6, 2009, now U.S. Pat. No. 8,065,193 which is hereby incorporated herein by reference. This application is a continuation-in-part of U.S. Ser. No. 12/492,132, entitled Universal One-Click Online Payment Method and System, filed Jun. 25, 2009, which is hereby incorporated herein by reference.

FIELD OF THE INVENTION

This invention relates to a method for monetizing online content on the internet.

BACKGROUND OF THE INVENTION

The internet is the main source of news and information for growing numbers of people. Mainstream media news organizations, niche news outlets, and alternative viewpoint news sources all maintain news content on websites. In addition to news, the internet has fostered the growth and popularity of "web logs" or "blogs" run by "bloggers" as sources of news and information.

One problem with the internet as a source of news and information is that it is difficult for news organizations or bloggers to generate revenue. Popular sites can attract paying advertisers, but in the current internet environment the sheer number of websites offering news and information makes the pool of advertising dollars insufficient to bring in satisfying revenue for many. Additionally, some websites or blogs have very loyal, but very limited readership, so that the size of the reading audience makes the website unattractive to advertisers or otherwise monetize their efforts.

There is a continuing unmet need for a method for internet content providers, such as organizations with websites, individuals or groups with blogs, and syndicated news organizations to generate revenue, or additional revenue, for the content provided to the public.

Many websites provide news and information content with a provision for the reader to leave comments. For example, a news story can include a place, usually at the end of the article, for the user to post his or her comments. Sometimes the user must first register, but other times the user simply leaves a comment pursuant to the instructions given. Likewise, many blogs provide the opportunity for readers to comment. Again, the person commenting may have to first register, but not always. Sometimes comments are moderated, which means they can be first checked for content before posting publicly on the website.

Popular or controversial news stories or blog entries can generate many hundreds of comments. Comments are usually posted in chronological order, and can be ranked or emailed by readers. Sometimes comments are posted in non-chronological order, such as by "most popular" or "most emailed". Sometimes the comment section is set up to allow comments on comments, with those readers submitting comments, i.e., commenters, often generating a line of thought that can be independent of the original story.

A reader of a news story or blog often checks the comments, but may not read down more than a few comments, and may read only the first and last comments. Many comments go unread for lack of visibility, that is, they are in essence "buried" in the multitude of other comments. Many readers and commenters (i.e., readers who leave comments) alike can find the lack of attention to particular comments to be frustrating. For example, a reader who wishes to leave what the reader perceives to be a particularly salient comment may be frustrated by the knowledge that her comment might be in the middle of hundreds of others, thereby making it highly unlikely to be read by anyone.

There is a continuing unmet need for a way to permit commenters on news stories or blog entries to get their comments noticed.

Often internet content providers offer readers the opportunity to purchase goods or services. Various methodologies and systems are currently known and used to effect commerce via electronic means such as the internet. Because of security concerns, known services require user names and passwords, or the entry of personal information such as credit card data each time a financial transaction is made, making transactions cumbersome for readers. For example, it is believed that the popular online system PAYPAL® requires users, in addition to an initial registration, to enter a user name and password upon each use of the its service. For occasional users this is a hindrance to quickly transacting business, and for low-cost goods or services, the hindrance can be prohibitively high, keeping some users from completing a transaction. Other services, such as APPLE® computer's popular iTunes® music are believed to utilize the so-called "one-click" technology pioneered by Amazon.com, which is believed to map a server-assigned client identifier to a purchaser, which thereafter permits purchase completion based on purchaser-specific information already stored at the server system. However, it is believed that current "one-click" technology nevertheless requires the user to log on with a user name and password if the user is not using a computer having a file called a "cookie" in which is the assigned client identifier. And, it is believed, even when the user is on a computer having a sufficient file having the required cookie, the user is nevertheless required to enter a password prior to completing a purchase of goods or services from the internet content provider.

There is a continuing unmet need for an easy, quick, and relatively secure, i.e., relatively low risk, methodology for effecting electronic commerce utilizing the internet.

SUMMARY OF THE INVENTION

A computerized system for making money on the internet is disclosed. The system includes an internet content provider providing online information and an online comment section associated with the online information. The online comment section can be capable of having posted thereto reader comments in a free default format. A receiving account can be associated with the internet content provider. A communication interface can be utilized by the internet content provider and adapted to receive financial transaction data from a payment account of a reader to the receiving account of the internet content provider over a communication network. Computer executable instructions can be used for performing steps including displaying an offer associated with said online information, the offer being an offer to alter a comment from the default format to a distinctive format for a predetermined fee; receiving by the internet content provider, from the reader of the information an acceptance of the offer including a request to alter a comment from the default format; debiting the payment account of the reader with the predetermined fee; crediting the receiving account with the predetermined fee; altering the comment from the default format; displaying the altered comment in the online comment section, wherein the altered comment does not include an indication of the time of posting. The system can also have a processor for executing the computer executable instructions and a memory for storing at least the computer executable instructions.

DETAILED DESCRIPTION OF THE INVENTION

Figure 1:
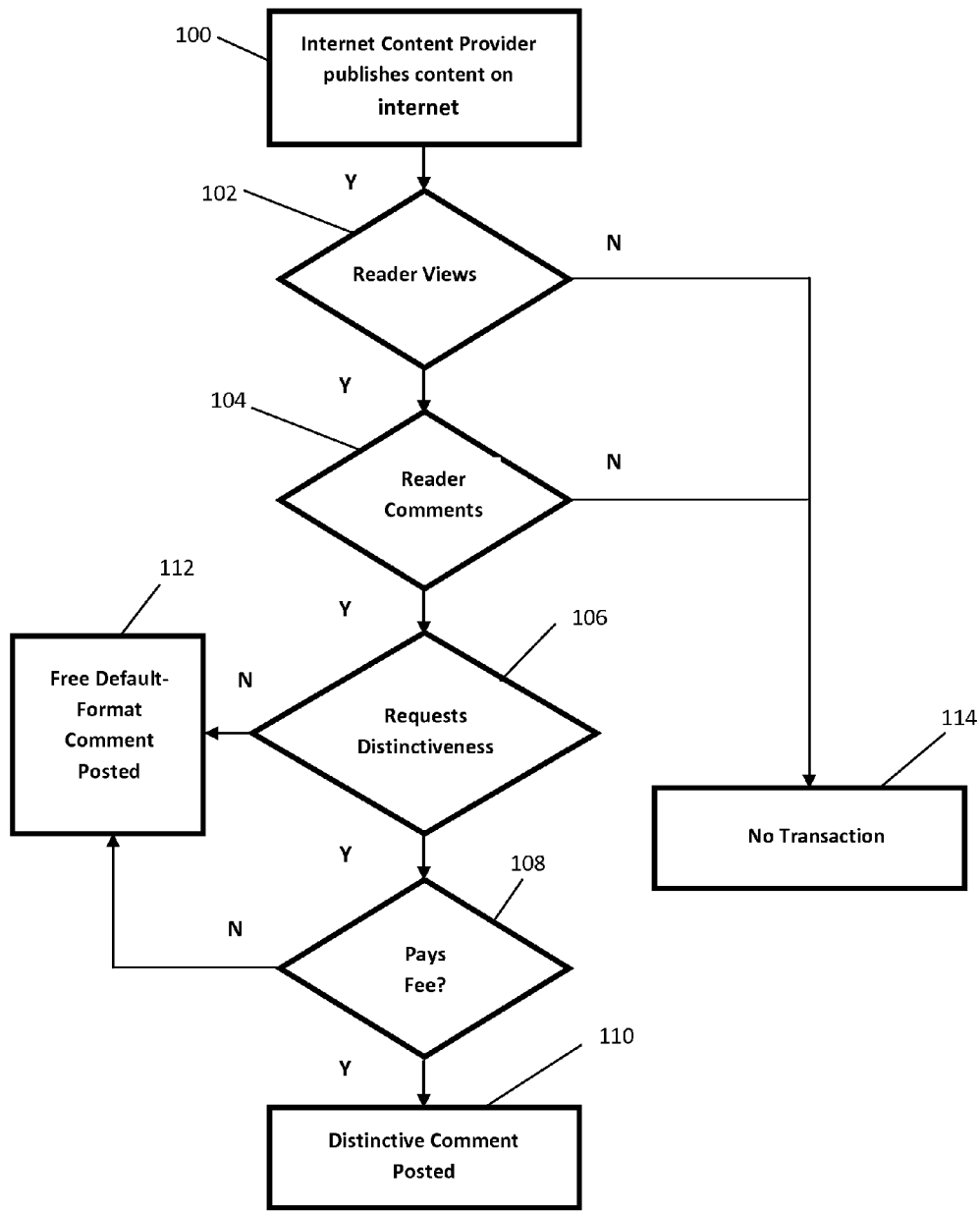
FIG. 1 is a flowchart description of one method of the present invention.

The method of the present invention has as an object the making of money using the internet. As used herein the term internet is used in its normal usage to be the system, including the World Wide Web by which content providers, such as news sites, can supply web content, such as from a news server, to be displayed, or published, on internet connected client (or reader) computers operable to access and display the content via a web browser. Therefore, computers, networks, internet connections, operating systems, programs, data structures, processing units, system memory components, system busses, wireless connections, cookies, mobile devices such as Blackberries®, iPhones®, and other computing hardware and software as known in the art for internet communication can be utilized in the present invention. By way of further example, a computer and computing environment suitable for practicing the present invention is described in U.S. Ser. No. 11/197,067, published Feb. 15, 2007 as US 2007/0038646, entitled Ranking Blog Content, and particularly paragraphs [0083] to [0102] and FIGS. 11 and 12. Likewise, a method and system for placing an order via the internet can be practiced according to that disclosed in U.S. Pat. No. 5,960,411, granted Sep. 28, 199. Thus, without being bound by theory, or limited by lack of precise jargon, the description of the invention below is intended to be understood as being operable in the context of known means for operating websites, payment systems, computers, servers, and user-generated content, all as currently used for internet activity, but lacking in the inventive features of the present invention.

In the following description, for purposes of explanation, numerous specific details are set forth in order to provide a thorough understanding of the subject invention. It may be evident, however, that the invention can be practiced without some of these specific details.

The method of the invention allows willing readers to pay a fee for having posted comments to an online publication of an internet content provider rendered distinctive, the distinctive comments being altered from a default comment format so that the altered comments are distinctive relative to a default format. Readers can comment on a news story or blog entry, and the like, whether or not they read the online publication to which comments are associated. Readers can also be people who wish to alter for distinctiveness a comment of another. In this manner, readers desiring that the reading public read their comment, or the comment of another, can, by paying a fee to the internet content provider or a third party on behalf of the internet content provider, have a comment visibly changed in its online published format so as to make it stand out from the comments posted in a free default format.

Payment for having posted comments rendered distinctive can be accomplished by known methods. However, recognizing that in many cases the fee for such services by an internet content provider is likely to be relatively small, the present invention contemplates a method and system for making the transaction quick and easy. For web-browsing readers, particularly readers commenting on a news story, blog, or other internet content provider's site, such as DIGG® and other such news ranking sites, speed and ease are important. In one sense, for readers commenting on the internet, instant gratification is important. If a reader is required to enter in personal information such as name, address, email, credit card number, and the like, the reader is not likely to complete a purchase for a relatively modest amount. As fully described below, the present invention solves the problem of cumbersome purchase steps, offering the reader quick and easy purchasing of goods and services utilizing the internet.

"Internet content provider" as used herein refers to individuals, organizations, corporations, or other entities that utilize computers or computer systems to publish content on the internet for reading by those connected to the internet via web browsers operating on computers. Thus, for example, CNN is an internet content provider, providing news stories via the URL www.cnn.com to readers who enter the URL into the web browser on their personal computers. Similarly, The Huffington Post is an internet content provider, providing commentary in the form of a web log, or "blog" via the URL www.thehuffingtonpost.com to readers who enter the URL into the web browser on their personal computers. Readers can subscribe to internet content providers via syndication feeds, and individual URLs can be stored via browser "bookmark" or "favorites" utilities.

"Comment" or "comments" as used herein refers, in context, to the expression of the thoughts and/or opinion that a reader writes and/or posts in commentary, letters, and the like, for publication in the section of an internet content provider's web content that is intended for reader comments. The expression can take the form of text, as in letters, words and sentences, images, as in digital photos and videos, sounds, as in audio recordings, graphical descriptions, advertising, URL links, and combinations thereof. "Comments" or "comment section" also refers, in context, to the portion of a section of an internet content provider's website intended to contain the expression of readers' posted thoughts and/or opinion.

In prior art comment sections, the appearance or placement (relative to other comments and/or relative to the web page on which they appear) of the comment as publicly posted was not in the commenter's control. After submitting the comment it would show up posted in a default format utilized by the website or content provider, including, usually, in a chronological order with the time and date displayed. In some instances, the internet content provider permits certain html-code commands, and other limited textual commands to render text as bold, italics, and the like, all of which is not considered to be modified or altered to be conspicuous or distinctive within the scope of the present invention.

"Default format" as used herein with respect to the format of the comment section of an internet providers' story or blog entry, refers to a typical or standard format for comments utilized by a news site or a blog for which no fee is received from the commenter, and which format can, according to the present invention, be modified or altered by payment of a fee as disclosed herein.

"Commenter" as used herein is one who makes, leaves, or posts a comment on a page of an internet content provider. "Reader" when used in context of one who wishes to leave a comment is synonymous with commenter.

"Payer" as used herein is a person, company, or other entity controlling a payment account from which monetary funds can be dispersed or otherwise paid for goods or services. As used herein, a payment account controlled by a payer, such as an individual checking account, individual debit account, individual credit card, company credit or checking account, or the like, for which the payer is an account holder or is otherwise authorized to control the account, is said to be "associated with" the payer. Likewise, a receiving account is "associated with" an online merchant such as an internet content provider, if the account is owned or controlled by the internet content provider or owned or controlled by an entity in the internet content provider's trust.

In one embodiment, the internet content provider can be a news organization, providing news stories. In another embodiment, the internet content provider can be a blogger, providing opinion and other information, including news, on a blog. In either embodiment, whether it be a news story, a blog entry, or other information, the internet content provider can make provision for readers to leave an online comment, with an added provision of facilitating or permitting payment of a fee in exchange for having the reader's comment rendered more conspicuous and distinctive by altering or modifying it relative to a free default format, and/or by placing it in a distinctive position on a web page relative to other comments which may or may not be in a free default format.

In one embodiment, a news story or blog entry can have associated therewith, for example, at the end thereof, a section for readers to leave comments. Such comment sections and reader-generated comments are currently used by online content providers, and comments can include messages, URL addresses, video links, quoted material, letters, letters to the editor, and the like. Such comments are currently known to be posted in a default format for free, either with or without first registering, and either with or without moderation of the comment.

The present invention provides for a solution to a website's problem of lack of sufficient revenue, and at the same time, indulges a reader's desire to have his or her comment made more prominent, by providing for a fee payment from the reader to the internet content provider, or a predetermined third party handling the internet provider's financial transaction, in exchange for the internet content provider posting the reader's comment in a distinctive manner. In one embodiment, after the reader types out a comment, the reader can be prompted by an on screen prompt to pay a fee in exchange for the reader's comment to be modified from the standard or default format used for free (i.e., cost free, no fee paid by the reader) comments by making it distinctively different from other comments and/or placing it in a distinctive location or position relative to other comments. For example, for a fee, the internet content provider can keep a reader's comment as the first comment after a news story, regardless of the otherwise chronological timing of the posting.

In one embodiment, the reader can agree to pay a fee, and can pay the fee from a payment account via known methods of fee payment, such as by online credit card, online secure credit payment, or PAYPAL®. The reader's payment account can be a debit account or a checking account. The fee can be deposited into the internet content provider's receiving account, or a receiving account of a third party charged with receiving fees for the internet content provider. Any known online payment system can be used to allow the reader to pay a fee to the internet content provider or a predetermined third party. In one embodiment, for certain readers of a news site or blog, the internet content provider can set up, and the reader can subscribe to, a personal deposit account with money deposited therein by the reader from which the reader can instruct the news site or blog to deduct payment upon instruction by the reader to do so. As well, payment for goods or services utilizing the internet can be effected by the method and system disclosed more fully below, in which a purchaser can make purchases quickly and easily without necessarily having to input at the time of purchase credentials such as a username or password.

In one embodiment, in exchange for a fee paid by the reader, the reader's comment, letter, or the like can be posted in a condition altered from a free (no cost or fee) default format by use of, for example, a distinctive background, background color, border, border colors, text, text color, text font, text font size, and combinations thereof. For example, after paying a fee, the reader's comment, letter, photo, or the like can be displayed among the free default-format comments, with a distinctive background color, a distinctive border, larger font text, and combinations thereof. Similarly, after paying a fee, the reader's comment, letter, photo or the like can be posted in a different position or location relative to the free default-format comments. The different position or location can be a prominent, non-chronological placement with other comments, or a separate place on the web page with other comments, or on a separate web page. In this way of monetizing internet content, the public is benefited by an open market system that permits readers to satisfy their desire to be distinctive, while simultaneously providing revenue to the internet content provider, who can continue to provide valuable information to the public without charge.

In one embodiment, in exchange for a fee paid by the reader, the reader's comment can be altered from a free default format by allowing the user to customize the comment with the reader's choice of color, style, and/or size of various components of the comment.

In one embodiment, a specified distinctiveness, such as a distinctive appearance and/or position in a comments section or a distinctive appearance and/or position on a web page, can be auctioned off, similar to how items are auctioned on popular websites such as eBay®. For example, highly visible or otherwise well-placed comments, such as the first comment to appear after a news story or blog entry, or a separately displayed comment on a web page, can be auctioned to a highest bidder. In such an embodiment, a reader can place a bid for a specified position, such as the first comment to appear after a news story or blog entry, or any other designated spot. Upon placing the bid, the reader can be notified, either manually by a human website monitor, or automatically via software designed to handle bids such as that used by eBay® and the like, if he is the top bidder. Upon such notification, if he is not the high bidder, the reader can decide if he will raise (or "up") the bid so as to gain the desired spot, or take other action. If he is the high bidder, his comment will be posted in the bid-for distinctiveness. Additionally, the internet content provider can provide an option for the high bidder to be notified if another reader bids higher, thereby displacing his comment from its specified distinctiveness.

In one embodiment, the order or placement of distinctive comments can be according to the fee paid. Thus, in an auction-type environment, the current high bidding commenter can have his or her comment placed in a most distinctive manner, such as being the first comment to appear after a news story. The next highest bidder can have his or her comment placed in the second most distinctive manner, such as being the second comment to appear after a news story. In this way, the public is benefited by an open market "bidding war" that permits readers to satisfy their desire to be most distinctive, while simultaneously providing revenue to the internet content provider, who can continue to provide valuable information to the public without charge.

In one embodiment the internet content provider can guarantee a minimum or maximum time in a distinctive position for the fee received. Once the set time period expires, another reader can purchase the position for another set time period. In this manner, more than one reader can have his or her comment placed in a desirably distinctive position.

In one embodiment, a specified distinctiveness, such as a distinctive appearance and/or position in a comments section or a distinctive appearance and/or position on a web page, can be bid for, either by fixed price or by auction, for fixed time with a predetermined start time and stop time. In this manner, readers can bid for predictable timing of the exposure of their comments.

In one embodiment, a specified distinctiveness, such as a distinctive appearance and/or position in a comments section or a distinctive appearance and/or position on a web page, can be shared with other distinctive comments, such as in a special location on a web page, set apart from the free default-format comments.

In one embodiment the reader can bid for a desired spot, and if he or she is successful he or she can also put in a maximum bid to be automatically increased in predetermined increments if others bid for the same spot. Again, the basic concept is the same as, and can utilize all relevant software, executable programs, executable instructions, components, graphics, and algorithms of current online auction methods, such as the methods utilized by websites like eBay®. In this manner more than one reader can bid on any given desired position for posting a comment, with the criteria for successful posting simply being the highest bid. In one embodiment the internet content provider can set a predetermined time period in which bids are received, with the winning bid being rewarded the subject comment distinctiveness.

In one embodiment, the reader may desire to respond to another comment. In this case, the reader can be given the option of having the prior comment, to which he or she is responding, given the same distinctiveness of appearance and/or location as the reader's comment.

In one embodiment, another person other than the reader can pay a fee in exchange for having a comment made by another rendered distinctive. For example, a reader reading the comments made by others may read a comment in a free default format, which the reader would like to highlight for others by paying a fee in exchange for distinctiveness. In one embodiment, a commenter can be provided the means for ensuring that others cannot render their comment distinctive. For example, before leaving a comment to be posted in the comments section of a news story or blog entry, a commenter can be prompted to choose whether or not he or she would allow another person to change the appearance of the comment from the free default format to an altered distinctive format.

Therefore, the system and method of the present invention can be described as an internet-based system and method in which an internet content provider provides news or blog entry content on a website, for example, directly or via a server as is known in the art, or via any other manner known in the art. The internet content can be accessed by a person having an internet connection from a remote computer, such as a home computer connected via a service provider to the internet. For example, the internet content provider can be CNN.com, Foxnews.com, Yahoo.com, Salon.com, and the like, and the service provider can be Time Warner ROADRUNNER®, AOL, and the like. In general, the internet content provider and connected computer users utilize digital computer means to publish and access content via the internet, such as the World Wide Web, and can implement the content and other web-based activities by means of a processor for executing computer executable instructions and a memory for storing at least the computer executable instructions. The computers, processors, and memory can be any of known devices as is known in the art for implementing internet-based information content and user-configured online transactions.

In the present invention, in addition to permitting comments to be posted in a free default format, computer executable instructions of the system can prompt the reader to choose, such as by clicking or double clicking on a designated radio button, hyperlink, or other link, to pay a fee in exchange for the reader's comment, or comment chosen by a reader, being modified for distinctiveness relative to the free default format. The reader can be prompted at the time of making a comment, or the reader can be provided a link to elect to pay for distinctiveness of a previously posted comment.

Prior to paying a fee, or after electing to pay a fee, computer executable instructions of the system can provide one or more options for the reader or other user from which to choose. The internet content provider can provide one or more templates having pre-selected color and font schemes. The internet provider can provide an a la carte selection of various colors, borders, fonts, and the like so that the reader can choose his or her own attributes of distinctiveness. The internet content provider can provide a preview of the comment so that the reader can see what it will look like in the context of other comments before choosing to complete the transaction and have the altered, distinctive comment posted.

In one embodiment the fee required for a distinctive comment can be dynamically adjustable, and can be determined by conditions set by the internet content provider. For example, a base fee for a distinctive comment can be set to be a nominal cost of Y dollars. However, if many people are purchasing distinctiveness, it may be that "distinctive" is not so distinctive, so the internet content provider can raise the fee Z>Y dollars, thereby letting market conditions moderate how many distinctive comments are in a particular thread of comments. For example, the fee can be governed by an algorithm programmed into the computer executable instructions that adjusts the fee based on the percentage of distinctive format comments relative to the total free default format comments in a particular thread. When the percentage reaches a set figure, the fee can be raised accordingly. Likewise, if the percentage lowers below a set figure, the fee can be lowered to attract more paid comments.

In an embodiment incorporating a dynamically adjustable fee, the comment distinctiveness can be an altered appearance relative to a free default format, but the comments can be otherwise posted in chronological order. The algorithm that governs the dynamically adjustable fee can take into account the number of consecutive distinctive comments, such that upon a set number, such as three, the fee can increase such that the distinctive comments do not become indistinct due to relatively close proximity to other distinct comments.

By having a dynamically adjustable fee, an internet content provider can generate increased revenue above that which a flat fee might generate. Particularly controversial news or blog entries, for example, can generate many heated and emotional responses, such that the value to a reader for posting a distinctive comment can be greater, and with more interest in being distinctive, the internet content provider can enjoy greater revenue with increasing fees for distinctive posts.

Once the reader chooses to pay a fee, or after a reader wins the bidding for an auctioned distinctiveness, computer executable instruction can facilitate that the fee be paid via any of known internet fee-payment methods, including by credit card transaction, debit card transaction, checking account transaction, and fee paying services such as PayPal®, as well as the method described herein below. The fee can be paid from a payment account of the reader, such as a credit card account, a debit card account, a checking account, or a PayPal® account. The fee can be received in a receiving account, which can be a bank account of the internet content provider, or a third party entrusted with handling the financial transaction for the internet content provider. The computer executable instruction can generate for the reader confirmation of fee payment on screen, or via an email receipt, and the on screen information can provide the commenter any other information deemed necessary by the internet content provider. The fee can be paid by the method and system disclosed more fully below, in which a reader need not remember a user name and/or password to complete the financial transaction for fee payment.

In one embodiment, a distinctive comment can be auctioned to a highest bidder. In one embodiment, computer executable instructions display to a reader an offer for particular distinctiveness, and receive bids from readers, who communicate their desire by responding to the onscreen instructions to do so. The computer executable instructions can set a time period in which multiple bids can be received, and the highest bid can win the auctioned distinctive comment once and for all. Or the computer executable instructions can place a highest bidder comment in predetermined place of particular distinctiveness only for the time before and until there is a higher bid for the same particular distinctiveness. For example, a news internet content provider can supply a news article to be displayed on an internet connected reader's computer operable to display the article, for example in a web browser. The news article can have at the end thereof displayed a comments section, and at least one position for one or more comments of particular distinctiveness reserved for a highest bidder. At Time 1, Reader 1 can bid N dollars and be the high bidder, thereby having his comment displayed with distinctiveness reserved for the high bidder. But, if at Time 2 Reader 2 bids and pays an amount greater than N dollars, then Reader 2's comment replaces Reader 1's, or is placed in a position more distinctive than Reader 1's. In one embodiment, Reader 1 can then receive a notification, for example via email, that he is no longer the highest bidder, and provided an opportunity to bid again. In another embodiment, Reader 1 can set a maximum bid to be increased automatically in increments sufficient to outbid subsequent bidders, up to a maximum amount specified, thereby remaining in the distinctive position until the maximum bid amount is surpassed by another bidder.

Figure 3:
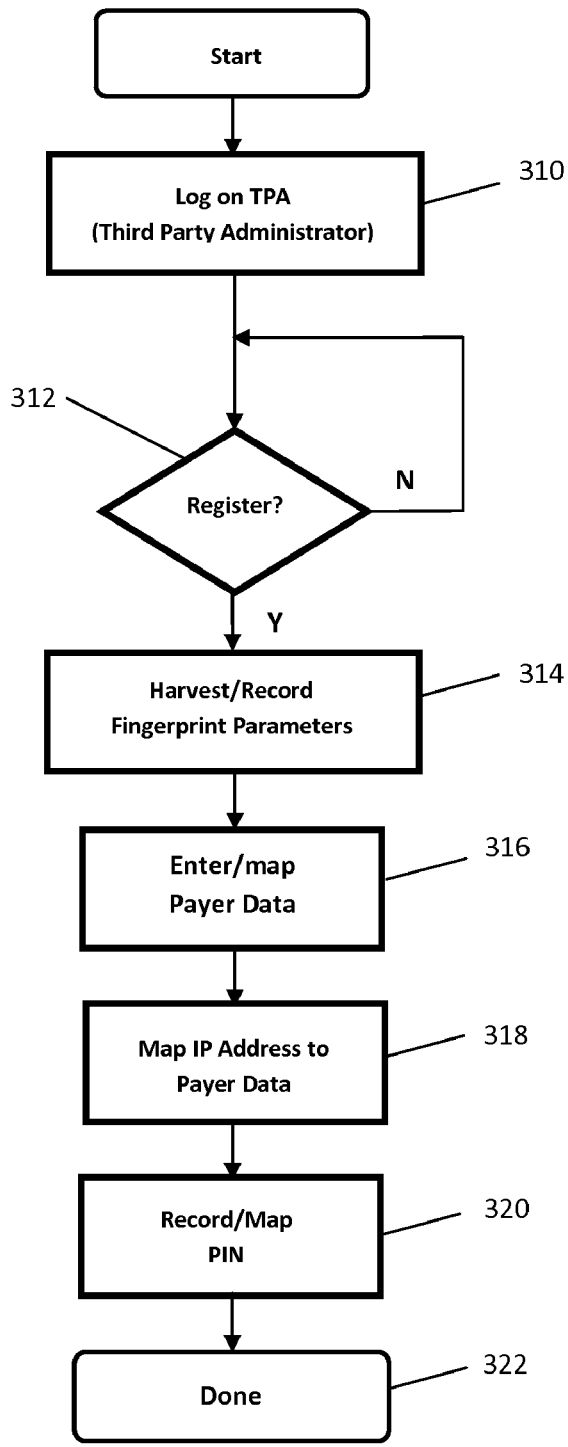
FIG. 3 is a flowchart description of one method for enabling electronic payment utilizing the internet.

Referring to FIG. 1, one embodiment of a system and method for making money on the internet by providing for reader comment distinctiveness in exchange for a fee is shown. Generally, an internet content provider publishes content 100 on the internet, the content being accessible to readers by use of a computer having internet access and being connected via a web browser to the URL of the internet content provider. A reader views 102 the published internet content, which can be a news article, a blog entry, a video clip, and the like. The published internet content offers the reader the opportunity to leave comments, at least in a free default format or in a for-fee distinctive format. The distinctive format can be described by the internet content provider, including by examples of sample formats, positions, and the like. Leaving comments may require registration with the internet content provider, and may require approval by a moderator. The reader can choose to leave a comment 104, and decides whether to choose distinctiveness for his comment 106. If the reader does not view the internet content, or if the reader chooses not to leave a comment, there is no online transaction 114. If the reader chooses to pay for distinctiveness, the reader pays 108 via any known methods for executing a financial transaction over the internet, including by entry and processing from a reader's payment account, such as by use of a credit card or debit card, direct bank transfer, PayPal®, to the internet content provider's payment receiving account (or a third party's receiving account, as arranged by the internet content provider), or by the method and system described below with respect to the flowcharts shown in FIGS. 3 and 4. Once the reader's fee is processed, such that a payment is moved from a reader's payment account to the internet content provider's account, the reader's comment is posted in a distinctive format 110. If the reader does not wish to have her comment rendered distinctive, or if the reader does not pay a fee to do so, the reader's comment can be posted in the free default format 112.

Figure 2:
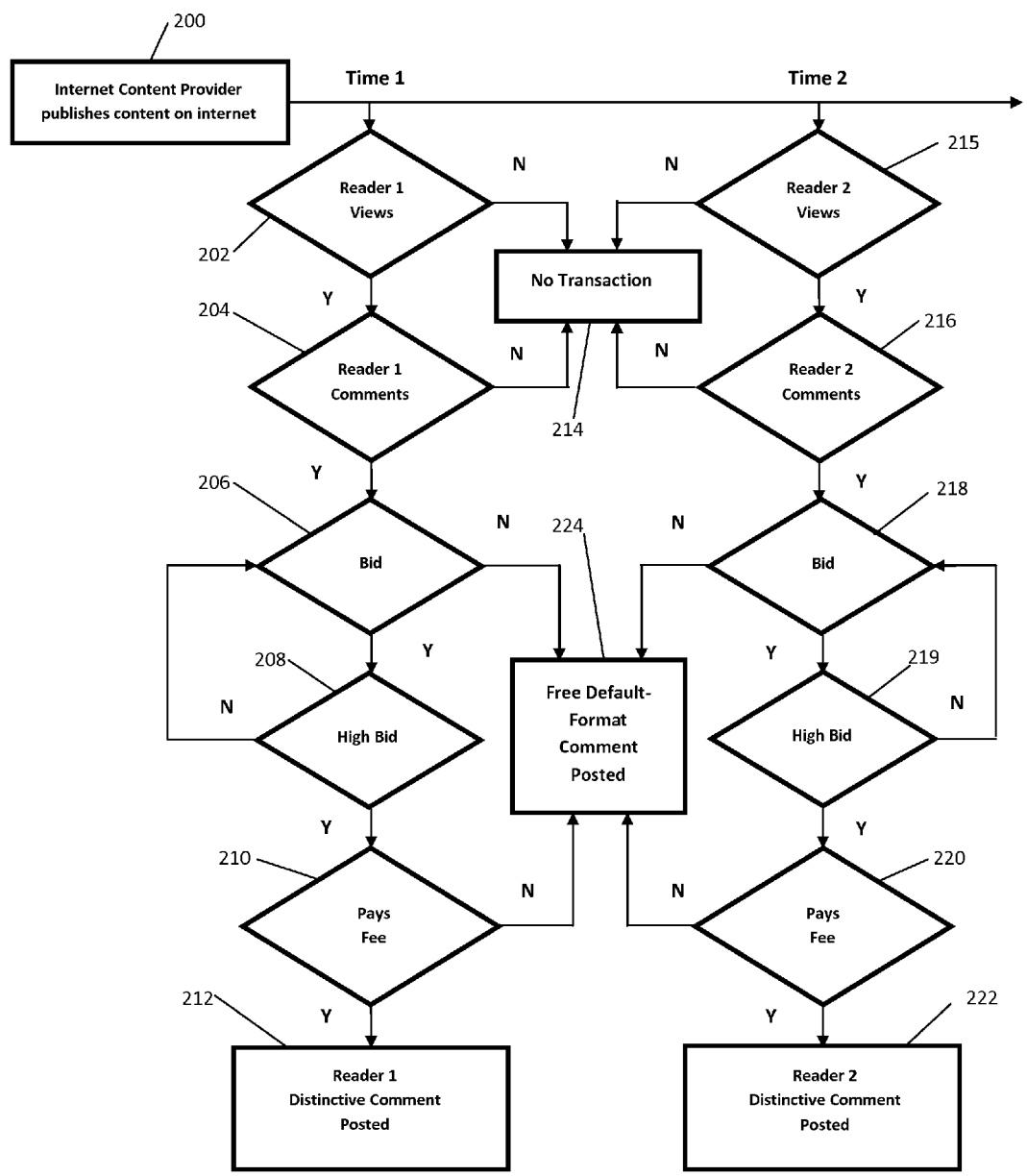
FIG. 2 is a flowchart description of one method of the present invention.

Referring to FIG. 2, one embodiment of a system and method for making money on the internet by providing for distinctiveness in exchange for a fee is shown. Generally, an internet content provider publishes content 200 on the internet, the content being accessible to readers by use of a computer having internet access and being connected via a web browser to the URL of the internet content provider. The published internet content offers readers the opportunity to post comments in at least in a free default format or readers can bid for a distinctive appearance and/or distinctive position of a posted comment. The distinctive appearance can be described by the internet content provider, including by examples of sample formats, positions, and the like. Leaving comments may require registration with the internet content provider, and may require approval by a moderator. At Time 1 a first reader, Reader 1, views 202 the published internet content, which can be a news article, a blog entry, a video clip, and the like. If Reader 1 chooses to not leave a comment, no transaction occurs 214. Reader 1 can choose to leave a comment 204, and decides whether to bid for distinctiveness for his comment 206. If the reader chooses to bid for distinctiveness, the reader bids 208 via known internet auction techniques, including those used by eBay®. If Reader 1 is not the highest bidder, Reader 1 can bid again 206. If Reader 1 is the highest bidder, Reader 1 can pay 210 the bid amount by any known methods for executing a financial transaction over the internet, including by entry and processing from Reader 1's payment account, such as by use of a credit card or debit card, direct bank transfer, PayPal®, to the internet content provider's payment receiving account (or a third party's receiving account, as arranged by the internet content provider), or by the method and system described below with respect to the flowcharts of FIGS. 3 and 4. Reader 1 can also, if provided for by the internet content provider, set a maximum bid and incremental amounts that he wishes the internet content provider to automatically raise his bid up to the maximum amount, in the event that a second reader wishes to out-bid Reader 1's current bid. Once Reader 1's fee is processed, such that a payment is made from Reader 1's payment account to the internet content provider's account, Reader 1's comment is posted in a distinctive format 212. If Reader 1 does not bid or does not pay the bid amount, Reader 1's comment can be posted in the free default format 224.

Further as shown in FIG. 2, a second reader, Reader 2 can read 218 the published content 200 at Time 2, and can choose to leave a comment 216, and decides whether to bid for distinctiveness for her comment 218, with this aspect of the invention requiring that Reader 2 must bid higher than at least Reader 1's winning bid 219, as well as, if used, Reader 1's stored maximum bid 220, which can be raised automatically in predetermined incremental amounts up to Reader 1's specified maximum. If Reader 2 chooses to not leave a comment, no transaction occurs 214. If Reader 2 bids but is not the highest bidder, Reader 2 can bid again 218. If Reader 2 is the highest bidder, Reader 2 can pay 220 the bid amount by any known methods for executing a financial transaction over the internet, including by entry and processing from Reader 2's payment account, such as by use of a credit card or debit card, direct bank transfer, or PayPal®, to the internet content provider's payment receiving account (or a third party's receiving account, as arranged by the internet content provider). Reader 2 can also, if provided for by the internet content provider, set a maximum bid and incremental amounts that she wishes the internet content provider to automatically raise her bid up to the maximum amount, in the event that a subsequent reader wishes to out-bid Reader 2's current bid. Once Reader 2's fee is processed, such that a payment is made from Reader 2's payment account to the internet content provider's account, Reader 2's comment is posted in a distinctive format 222, which can replace Reader 1's, or displace Reader 1's to a different position. If Reader 2 does not bid or does not pay the bid amount, Reader 2's comment can be posted in the free default format 224.

In one embodiment of the method of the present invention, the method can be as described above with respect to FIG. 2, but modified in that the internet content provider can allow for multiple "top" spots, such that a second, or third highest bidder can gain a particularly distinctive comment.

The method of the present invention can be implemented in conjunction with a promotion of the internet content provider. For example, the internet content provider can have a sweepstakes promotion, whereby readers who pay for comments can be entered into a sweepstakes for an award, such as an award for a "super-distinctive" comment, which can be a comment made uniquely distinctive for a time.

The method of the invention can be associated with a trademarked slogan, such as "Cop the Top Spot" and promoted conspicuously on the internet content providers web pages. In one embodiment an internet content provider displays in online information a window advertising an offer to make a comment distinctive.

The method of the present invention can be implemented by having "dueling comments" whereby two opposing viewpoints can be displayed in appropriately disposed comment sections, whereby two paying readers can have their respective viewpoints displayed for readers to compare. For example, two sections for fee-paid distinctive comments can be displayed in side-by-side relationship, or in alternating chronological relationship.

The method and system of the present invention can include as an added benefit the absence of a time and/or date associated with altered comments, that is, comments made distinctive by payment. Current blogs and news sites typically list the time and date of posting of comments. But, surprisingly, it has been found that such information adds nothing to the comment's value. Except for curiosity on the part of readers, the time and/or date is unnecessary and, although universally utilized, has no inherent value to the content of the comment. For this reason, in one embodiment of the present invention the altered comment lacks an indication of the time of posting. That is, a comment made distinctive according to the present invention can be posted in the absence of, i.e., without, an indication of the time of posting. Such lack of time and/or date notation can aid in avoiding a reader's prejudging a comment's content based on knowledge of payment, of suspicion of payment inferred by an out-of-order time notation.

The method of the present invention utilizes computers, wherein the term computers encompasses the whole of components such as processors, memory, servers, software, hardware, and the like, and wherein computers as such are machines for facilitating the method. Therefore, the method of the present invention can be described as machines transforming the subject matter of online reader comments. That is, the computer machines are utilized to transform the physical representation of the tangible expression of online comments, from one tangible output to a different tangible output, e.g., from a first default tangible expression of content to a second distinctive tangible expression of content.

The concept underlying the method of the present invention could be reapplied analogously to the print media of newspapers and magazines, with the system and method using online features and capabilities. A print magazine, such as Newsweek, could accept online submissions of letters to the editor for its newsstand print magazine, and could offer fee-based distinctiveness to readers who so desired. Readers who pay the associated fee could have their comments printed in the magazine made distinctive with respect to the free default comments.

The financial transaction involved with the payment of a fee by the reader, as well as a financial transaction for any exchange for any goods or services over the internet, can be completed according to the method and system described herein below. In particular, the method and system disclosed is intended to render the financial transaction virtually barrier free to the payer and payee alike. In the manner described financial transactions, particularly relatively low-value transactions, can be effected quickly and easily by the purchaser, resulting in increased revenue for the goods or services provider.

As used herein, the term "payer" is the person from whose payment account funds are transferred from in a financial transaction according to the method and system herein (referred to herein as payer or payer/client). However, because the method and system can work solely on the basis of the identity of the client system (e.g., a home computer), and not the identity of the person using it at the time of a financial transaction, the term payer is also used herein to indicate one using a client system for purposes of effecting a financial transaction, even though it is recognized that in actual practice the person completing a financial transaction may not be an actual payer but can be a reader using the payer's client system, a commenter using the client system, a client system owner, as well as a fraudster, an identity thief, a hacker, a forger, or an otherwise unauthorized user of the client system.

Without being bound by theory, it is believed that the method and system of the present invention for effecting a relatively quick, easy electronic financial transaction is beneficial because users are willing to incur relatively more risk with respect to unauthorized transactions in exchange for ease and speed of the transaction and control over, and limits on, the consequences of any unauthorized purchases.

In one embodiment the method and system for payment of an amount for goods or services, including a fee for making a comment distinctive, can be paid from a payer's payment account into a receiving account for the benefit of the payee without the payer providing or needing to type in a password or any other user identifier at the time of the transaction.

In one embodiment the method and system for payment of an amount for goods or services, including a fee for making a comment distinctive, can be paid from a payer's payment account into a receiving account for the benefit of the payee without the need for manually entering credentials such as a password or other identifier as long as the purchase amount is below a payer-specified amount.

In one embodiment the method and system for payment of an amount for goods or services, including a fee for making a comment distinctive, can be paid from a payer's payment account into a receiving account for the benefit of the payee without the need for manually entering credentials such as a password or other identifier as long as the number of purchase transactions per time period, such as the number of purchases per day, is below a payer-specified number.

In one embodiment the method and system for payment of an amount for goods or services, including a fee for making a comment distinctive, can be paid from a payer's payment account into a receiving account for the benefit of the payee without the need for manually entering credentials such as a password or other identifier as long as the total cumulative purchase amount of per time period, such as the total amount purchased per day, is below a payer-specified amount.

In one embodiment the method and system for payment of an amount for goods or services, including a fee for making a comment distinctive, can be paid from a payer's payment account into a receiving account for the benefit of the payee without the need for manually entering credentials such as a password or other identifier, but if a password has already been entered on the client system, such as in the user's initial log on, the already-entered password can be used as an additional credential for extra risk mitigation at the time of purchase.

In one embodiment the method and system for payment of an amount for goods or services, including a fee for making a comment distinctive, once a purchase amount is paid from a payer's payment account into a receiving account for the benefit of the payee, a message confirming the purchase can be sent to the payer, such as by email, cell phone, SMS text, Twitter, instant message or the like. In one embodiment confirmation is sent in a manner that is likely to be substantially instantly received by the payer, such as by instant message, text message, Twitter, or the like. In one embodiment, the confirmation is sent to a device other than the client system, such as to a payer's (or a payer-designate's) cell phone or other mobile device.

In one embodiment the method and system for payment of an amount for goods or services, including a fee for making a comment distinctive, once a purchase amount is paid from a payer's payment account into a receiving account for the benefit of the payee, and once a message confirming the purchase is sent to the payer, such as by email, cell phone, SMS text, Twitter, or the like, is sent, the payer can signal, such as by return email, SMS text, or the like, to stop all future payments from the payer's account until further notification.

As mentioned above, the method and system for electronic payment by a payer of an amount to a payee as described herein is premised on the perceived fact that payers are willing to incur more risk for internet-based financial transactions in return for control over the consequences of unauthorized or mis-use of the method and system. For example, a payer desiring to make a purchase over an electronic network such as the internet is less likely to demand username and/or password access for purchase amounts that are relatively small.

Likewise, a payer desiring to make a purchase over an electronic network such as the internet is less likely to demand username and/or password access for certain transactions if the payer can be assured of receiving a timely notice of payment, including allegedly unauthorized payment, and, in some embodiments, provided the opportunity to stop future transactions in a timely manner.

For many financial transactions, such as payment for making a comment distinctive on an internet content provider's comment section, or downloading music, or contributing to charity, the amount to be paid can be relatively small, such as $1.99. For this relatively small amount, and due to the fast paced nature web browsing in general, many users would forego the payment and the benefit if payment required entering data, including a username and/or a password, because it's not worth the trouble. Likewise, for this relatively small amount, and due to an option wherein the user can pre-set user-specified controls, such as a maximum amount per transaction, and/or a maximum number of transactions per time period (e.g., hour, day, week, etc.), and/or a maximum total amount per time period (e.g., hour, day, week, etc.), a user may be willing to forego the added security of a username and/or password for the convenience of a relatively quick, easy transaction.

In a system for electronic payment by a payer of an amount to a payee utilizing an electronic network such as the internet a payer first registers with a third party administrator (TPA) that retains payer-specific information and payee-specific information for use in facilitating financial transactions. Thus, a payer can register online with a TPA that records information in a manner known in the art for recording information, including confidential information, in an electronic format, including information such as the payer's name, address, mailing address, telephone number, wireless telephone number (for Twitter, voice and/or SMS text communication), credit card data, bank account data, personal identification number (PIN), security questions (for use in verifying identity), email address, twitter address and purchase limit criteria. The purchase limit criteria can be used to place limits on per-transaction purchase amounts and/or the number of transactions per time.

In addition to the payer-specified information, the TPA can obtain a client system device fingerprint (also known as a machine fingerprint), which is a representation of, and can be a summary of, certain software or hardware settings of the payer's client system computer, and which device fingerprint is intended to be unique to the payer's computer. A client system can be a home computer, a personal computer, a laptop, or any other electronic device capable of internet connectivity and communication of payment directives. A device fingerprint can be utilized by the TPA as a client system identifier, and a device fingerprint can be a unique identifier. The client system identifier is used by the TPA to authenticate the payer's client system and approve a request by a payer (or someone else using the payer's client system) for a financial transaction. The device fingerprint can be assigned to, or have components thereof assigned to, the client system by the server system of the TPA. The device fingerprint can consist entirely of non-assigned (by the TPA) data or information. The device fingerprint can consist of a string of binary units, a string of alpha-numeric characters, or combinations thereof. The device fingerprint can be passively assembled, without payer-noticeable querying of the client system, and can include factors such as a client system's TCP/IP configuration, OS fingerprint, IEEE 802.11 (wireless) settings, hardware clock skew, and combinations thereof. The device fingerprint can be actively assembled, such as by querying the payer/client for information, installing an executable code directly on the client machine, installing a "cookie" file, installing or recording attributes such as a MAC address, or other unique serial numbers assigned to the payer client system software or hardware. If necessary, the TPA server system can employ JavaScript or other client-side scripting language for the harvesting of parameters and/or the enabling of a device fingerprint, with the intention of establishing a stable, unique device fingerprint. The device fingerprint can be solely device specific, that is, the device fingerprint can consist solely of device-specific information or parameters and not any user-, or merchant server-specified information in the form of passwords, cookies, or the like.

The device fingerprint can serve as the sole credentials for a TPA to authenticate a client system and to authorize payment from a payer's payment account. The TPA can, in some embodiments, be used with additional credentials, such as a password, a PIN, a voice command, a fingerprint scanner, a code on a cookie file, or other device. In one embodiment credentials other than the device fingerprint can be utilized for authorization by a payer for payments above the payer-set risk-mitigating limits discussed herein. For example, if a payer registers with a TPA and specifies that no purchase is to be authorized in amounts greater than $100, the TPA can authorize payments in amounts less than $100 based on obtaining a device fingerprint alone, but can authorize payments in amounts greater than $100 if the user of the client system enters additional credentials upon prompting by the TPA to do so.

In one embodiment, a device fingerprint can be a code, or a unique code, associated with and accessible from a client system hard drive or other component. For example, a hard drive manufacturer can embed in a segment of a hard drive, or record on another accessible component such as a graphics card, video driver, or the like, a code or other identifying device which can be accessible by other computer and/or server systems in communication with the client system, such as via the internet. In one embodiment, a device fingerprint can be a code, or a unique code, associated with software installed on a client system. In one embodiment client systems can be manufactured "TPA-ready" such that the hardware and/or software configuration(s) are set up for use with a TPA according to the method and system disclosed herein. In one embodiment, client systems can be "pre-registered" such as by being manufactured with a dedicated device fingerprint and wherein a user enters all necessary information onto the client system prior to accessing a TPA website. In such as system, the user can utilize the services of a TPA from the first time the user clicks a clickable access link from a registered internet content provider's website, without having to register on the TPA's website. The TPA can, upon first linking in by the client system, access, record, map, and otherwise store sufficient information to facilitate payment from a user's client system.

The device fingerprint can be obtained by the TPA upon a request by the payer for the TPA to authorize and pay an amount to a payee, and the access can be automatic and transparent to the payer, so that upon request for payment by the payer to the payee via the TPA, the TPA accesses the device fingerprint without the payer doing anything more. That is, the method and system of the invention can be implemented in a manner such that a payer can make a purchase by clicking one link, or button, without being required to manually enter any information or data such as a password.

Because the TPA accesses the client system to detect a device fingerprint for authenticating a client system without further interaction from the payer, it can be that the device fingerprint is both unique (maximum diversity) to avoid another user inadvertently having the same device fingerprint, and unchanging (maximum stability), which can require that system settings not change on the client system. The two parameters can be linked in that the more relatively stable the device fingerprint (i.e., the less parameters used to build it, and therefore the fewer parameters subject to change), the more likely the device fingerprint may not be, or remain, unique relative to other client systems registered by the TPA. Therefore, in practice, if only client system parameters are used to compile the device fingerprint, it may be that the device fingerprint is not unique, and another client, different from the payer/client system, may have the same device fingerprint.

Because there is a possibility that the payer's client system's device fingerprint can be the same as another client system's, the method of the invention can include a step of a payer verifying his or her identity after the TPA recognizes multiple client system device fingerprints. Verification can be by any means known in the art, including by password, personal identification number (PIN), or merely by the TPA querying the payer for a first and/or last name, or by the TPA (for ease of user interaction) providing a payer-specific pick list of non-sensitive items, such as first names, including the name's associated with both (or all) TPA-registered clients having the same device fingerprint, and having the payer indicate, such as by clicking on a button, his or her first name (or other payer-specific non-sensitive information). At this time computer executable instructions on the TPA servers and/or client-side scripting code can augment the client system device fingerprint to increase the chances of it being unique.

The payer can instruct certain transaction controls to the third party, such controls being implemented by computer executable instructions maintained by the third party, and which are communicatively effective in facilitating a financial transaction between the payer and the internet content provider payee. The payer can instruct the third party to use the payer's client system's device fingerprint for approving and implementing all purchase instructions. The payer can instruct the third party to use the payer's client system's device fingerprint as a unique identifier for approving and implementing all purchase instructions for purchases below a maximum amount pre-set by the payer during registration, or later, with the third party. The payer can instruct the third party to use the payer's system log-on password and/or the fact of the payer having used a password to log onto the payer's computer (for example, by setting a "password flag" during startup) for purchases above an amount pre-set by the payer during registration with the third party. The payer can instruct the third party to limit the number of transaction per time, such as number of transactions per hour, or per day. The payer can instruct the third party to limit the total amount of purchases per time, such as per hour, or per day. The payer can instruct the third party to notify the payer upon each transaction, via email, SMS text, Twitter®, or any other form of communication. The notification of a transaction can include a way for the payer to stop future transactions, such as by a phone number, text message, reply text message, reply Twitter®, HTML hyperlink, or other electronic communication. All payer-specified controls can be set for use individually or in combination.

In one embodiment an internet user, such as a reader of news or blogs online, or a purchaser of online catalog content, registers with a third party administrator (TPA), the TPA then being accessible to internet content providers who can utilize its payment services, much like internet content providers currently can use PayPal® for facilitating financial transactions. Thus, just as a potential payer can register with PayPal®, and thereafter utilize the PayPal® button provided on by an internet content provider to facilitate an online financial transaction by entering at least a PayPal® password, the present invention contemplates a potential payer can register with a TPA any or all of at least the above-mentioned information (payer's name, address, credit card data, etc.) to be used according to payer-specified risk mitigating controls in an online purchase of goods or services without the requirement that the payer manually enter any information at the time of purchase. Thus, in one sense, the present invention can be practiced like a combination of PayPal® and the Amazon.com® 1-click® method. It is, in this sense, a "universal one-click" method in which online purchasers can use one click technology with any merchant utilizing the services of a TPA with which a payer/client is registered.

In one embodiment a system for payment by a payer of an amount to a payee utilizing an electronic network such as the internet can be implemented by an internet content provider utilizing the services of a TPA, and rendering the TPA services accessible to the payer. For example, just as PayPal® services can be provided for by showing at the point of purchase a PayPal® "button" for the user to click, the internet content provider can provide HTML hyperlink, radio button, or other "clickable" access to the TPA for selection by a payer.

In operation the electronic commerce system of the present invention utilizes a communication interface, such as the internet or other communication network, adapted to transmit financial transaction data, as is known in the art. In one embodiment, in the terms of U.S. Pat. No. 5,960,411, which is hereby incorporated herein by reference for its enabling teaching of methods and systems for internet commerce, an internet content provider's server system and a client system, the client being in the context of the present invention a payer for online goods or services, and, in the context of a method and system of the present invention, can be a reader or commenter. The structure and methods of the present invention can be generally according to the description in the '411 patent with respect to FIG. 2 therein, which shows a client system in communication with a server system, with each system operatively connected via appropriate computer executable instructions to effect a financial transfer of funds from a payer to a payee. In the case of the '411 patent, the financial transfer is effected by so-called "one click" methodology between the client payer and the payee directly, without a TPA, using a methodology which relies on a server-assigned unique client identifier that is accessible to the server by way of a client file called a cookie. The present invention is an improvement over the "one click" technology embodied in the '411 patent.

The method and system of the invention can use network security and fraud detection systems and methods as disclosed in U.S. Pat. No. 7,272,728 and U.S. 2005/0278542, each entitled Network Security and Fraud Detection System and Method, and each of which are hereby incorporated herein by reference for all enabling teaching of network security and fraud detection, as well as for network device registration, reputation monitoring, uniquely identifying client devices, and generating fingerprints for network devices, such as the payer client systems of the present invention.

The method and system of the invention can make use of any known online payment methods and systems, including those disclosed in U.S. Pat. No. 5,677,955, entitled Electronic Funds Transfer Instruments; U.S. Pat. No. 7,275,685, entitled Method for Electronic Payment; and, U.S. Pub. No. 2007/0170245A1, entitled Secure Payment System, each of which are hereby incorporated herein by reference for all enabling teaching of online payment systems and methods, secure payment systems and methods, components, software, hardware, interface devices, and the like.

A method and system of the present invention for fast, easy, risk-mitigated electronic commerce is described with respect to the flowcharts depicted in FIGS. 3-6. In the illustrated embodiment certain non-limiting options and features are described. The skilled person will recognize that some or all of the disclosed features can be utilized in a method of the present invention, and the illustrated embodiments are not to be construed as preferred, optimal, necessary, or otherwise limiting. It is understood that all features and advantages of the present invention can be utilized or augmented with known technologies for security, such as encryption methodologies; speed, such as dynamic directory services; or any and all computer hardware, software, firmware and supporting accessories. Such methodologies can be according to the teachings of U.S. Pat. No. 7,209,970, entitled Authentication, Application-Authorization, and User Profiling Using Dynamic Directory Services, or U.S. Pat. No. 6,957,334, entitled Method and System for Secure Guaranteed Transactions over a Computer Network, or U.S. Pat. No. 6,330,550, entitled Cross-Media Notifications for E-Commerce, each of which are hereby incorporated by reference herein for their respective enabling teaching of methods and systems for electronic commerce, all of which teaching can be utilized in the present invention.

The method and system of the present invention generally involves three entities: 1) a payer, who can also be the reader of internet content who wishes to pay to have his comment made distinctive or purchase goods or services online; 2) a payee, who can be the internet content provider or other online merchant, and who is ultimately the recipient of the funds from a payer's account; and 3) a third party administrator (TPA), which authenticates a payer and administers payment from a payer to a payee.

The TPA is a party that acts as the "go-between" transaction facilitator between a payer/purchaser on a client system and a payee/merchant on a server system. Thus, a TPA of the present invention serves a similar function as that served by PayPal® in known methods and systems of electronic commerce, and a TPA can use any and all useful features and components of a PayPal® or PayPal®-like system as can be beneficially utilized in conjunction with the present invention.

A payer who desires to take advantage of the features of a method and system for electronic commerce described herein first registers from the payer/client's system with the third party administrator. Registration can involve supplying certain information relevant to identifying a client system, a payer, and a payment account, and can be achieved in any known manner, including by telephone, U.S. mail, or electronically by logging onto the TPA's website 310, for example by entering the TPA's URL into the client system's web browsing software. Registration can involve, for example, filling in fields on an online form which the TPA uses to populate a mapped directory of information which the TPA then stores and uses for facilitating monetary transfers. The payer can choose to register with the TPA 312, thereby availing the payer of the TPA's services. If the payer chooses not to register, the payer can stay on the TPA's website at the registration page, or, of course, close the page.

In the registration process the TPA can gather certain information from the payer, by obtaining it directly from the payer's client system, such as passively harvesting parameter(s) for the device fingerprint, and/or by requiring the payer to enter certain information, such as credit card information. In one embodiment, the TPA obtains and records in a data file the device fingerprint parameters 314 of the registering payer. The device fingerprint can serve in later transactions as a unique identifier of the payer's client system, and can serve as the sole credential for the TPA to authenticate a client system and authorize payment from a payer's payment account.

TPA computer executable instructions can facilitate at registration obtaining other payer information and mapping the information to the payer's client system's device fingerprint 316. Payer information can include any or all of various information such as the payer's name, address, mailing address, telephone number (for voice and/or text communication), credit card data, bank account data, security questions (for use in verifying identity), email address, PIN number (for use in verifying identity, or for approving over-limit transactions, twitter address and purchase limit criteria. The purchase limit criteria can be used to place limits on per-transaction purchase amounts and/or the number of transactions per time, and/or the total purchase amount over time. The TPA can also utilize, or embed, a file on the payer's client system to set a flag, referred to as a "password flag", if the payer utilized a password to log onto the payer's client system prior to logging onto the TPA's website. Many of the payer-specified information, such as a PIN, as well as certain parameters such as the password flag, can be utilized as extra risk-mitigating credentials or controls by the TPA.

Computer-executable instructions on the TPA system can facilitate the various methods and processes of the present invention, including mapping the entered payer data 316 appropriately in any manner known in the art, as well as any other payer-specified or system-provided controls the TPA offers. For example, the TPA can offer the option, and the payer/client can choose, to specify a maximum purchase amount per transaction, placing an upper limit on how much any individual purchase amount can be. Likewise, a payer/client can specify a maximum number of purchases per period of time, such as a maximum number of purchases per 24 hours, placing an upper limit on the number of purchases that the TPA can approve in any given time period, such as per hour, day, week, and the like. Further, a payer/client can specify a maximum total purchase amount per specified time period, placing an upper limit on the total purchase amount the TPA is to approve for any given time period, such as per hour, day, week, and the like. Still further, the payer/client can provide, and the TPA can record/map, a password or PIN to permit the payer/client to exceed the payer-specified limits, if desired.

The payer-specified controls can be utilized by the payer to mitigate risk associated with unauthorized use of the payer's client system by others. Thus, if the payer's client system's device fingerprint is utilized by the TPA to authenticate the payer and approve payment from the payer's mapped credit card account, an unauthorized user of the payer's client system (e.g., the payer's computer from which he registered with the TPA), can make unauthorized purchases, but the amount and/or number of such purchases will be constrained by the limits imposed by the payer during registration and account set up. These limits can effectively shield the payer from excessive losses due to unauthorized use. Moreover, as disclosed further below, after each purchase, the TPA can notify the payer via, for example, text message to the payer's cell phone upon completion of any purchase (or start of any transaction process), and the payer can, if desired, instruct the TPA to stop all transactions until further notification by the payer. Likewise, if, by chance, another client system has a device fingerprint identical to the payer's client system, the TPA can ask for further authentication from the payer, such as requiring the payer to enter a PIN, or answer a security question, or the like.

In one embodiment, all the payer-specified controls to limit risk of unauthorized use can be payer client system log-on password dependent. That is, upon linking to the TPA for a purchase transaction, the TPA can query the payer/client's system to indicate if, upon start-up of the payer's session on the payer's client system, the payer entered a password. If so, a password flag is set. Alternatively, a payer/client system's computer can set a flag upon entry of a correct password, and the TPA server system simply recognizes on the client system the status of the password set flag. The payer can specify a different upper limit to all purchase limits based on whether the password flag is set or not. For example, the payer/client can specify a maximum purchase amount per transaction of $5.00 if the password flag is not set, and a maximum purchase amount per transaction of $50.00 if the password flag is set.

TPA computer-executable instructions can map a payer's client system's device fingerprint to other payer information, such as the payer's credit card information 318. In like manner, any of the other information gathered during the registration process by the TPA can be mapped to the payer in a data file kept on the TPA server system, or otherwise recorded, kept or accessed as is known in the art. In one embodiment, the payer's device fingerprint can be a unique identifier assigned to the payer/client system, as disclosed in the above-mentioned U.S. Pat. No. 5,960,411. But one advantage of the present invention is the use for commercial transactions of the payer/client system's device fingerprint as a, or part of a, unique identifier. In such a system the merchant can utilize the TPA, obviating the need to assign a unique identifier to every user, and the payer need not remember a password, and need not be burdened with the time-consuming step of either entering a password, or going through a password recovery process.

Much of the information utilized by a TPA can be personally identifiably information (PII), and for that reason the TPA can have in place controls to ensure that PII is not inadvertently publicly disclosed. A device fingerprint can include PII, and, if so, can be maintained on the TPA's computer systems in a confidentially secure manner, as is known in the art for computerized systems holding confidential information.

The TPA can suggest or require a payer registrant to enter information for security purposes, such as a PIN 320, or other information like security questions. Such information can be utilized by the TPA to authenticate a payer if required for any reason. Likewise, a PIN or other password or security question can be used by the TPA to authenticate and approve purchases that exceed any of the payer-specified controls, such as maximum amount per purchase.

A merchant/payee Internet content provider can also register with the TPA information for achieving a transfer of funds from the payer's payment account to the payee's receiving account, including sufficient information to enable the TPA to facilitate the receiving of a deposit of monetary funds in a receiving account. Therefore, a potential payee internet content provider, such as an online merchant, desiring to have payers purchasing goods and services can register with the TPA such information as name, address, bank account number, bank codes, and the like. Upon registering, the merchant/payee can display upon the merchant's website (s) a visual indication of access to the TPA service, which indication can be a "clickable" hyperlink or a "button" for clicking on by the payer, in similar manner as currently many merchant websites make available by display the PayPal® service with a PayPal® button to be clicked on by the user.

Clicking can be by known means, for example by pressing the left button of a mouse, or the left button of a laptop touchpad. The TPA service can be named a distinctive name that connotes ease and speed. Such names as TapIt™ or FlashClick™ or OneTouch™ or WhizIt™ or NanoClick™ are contemplated as source identifiers for a TPA service.

Figure 4:
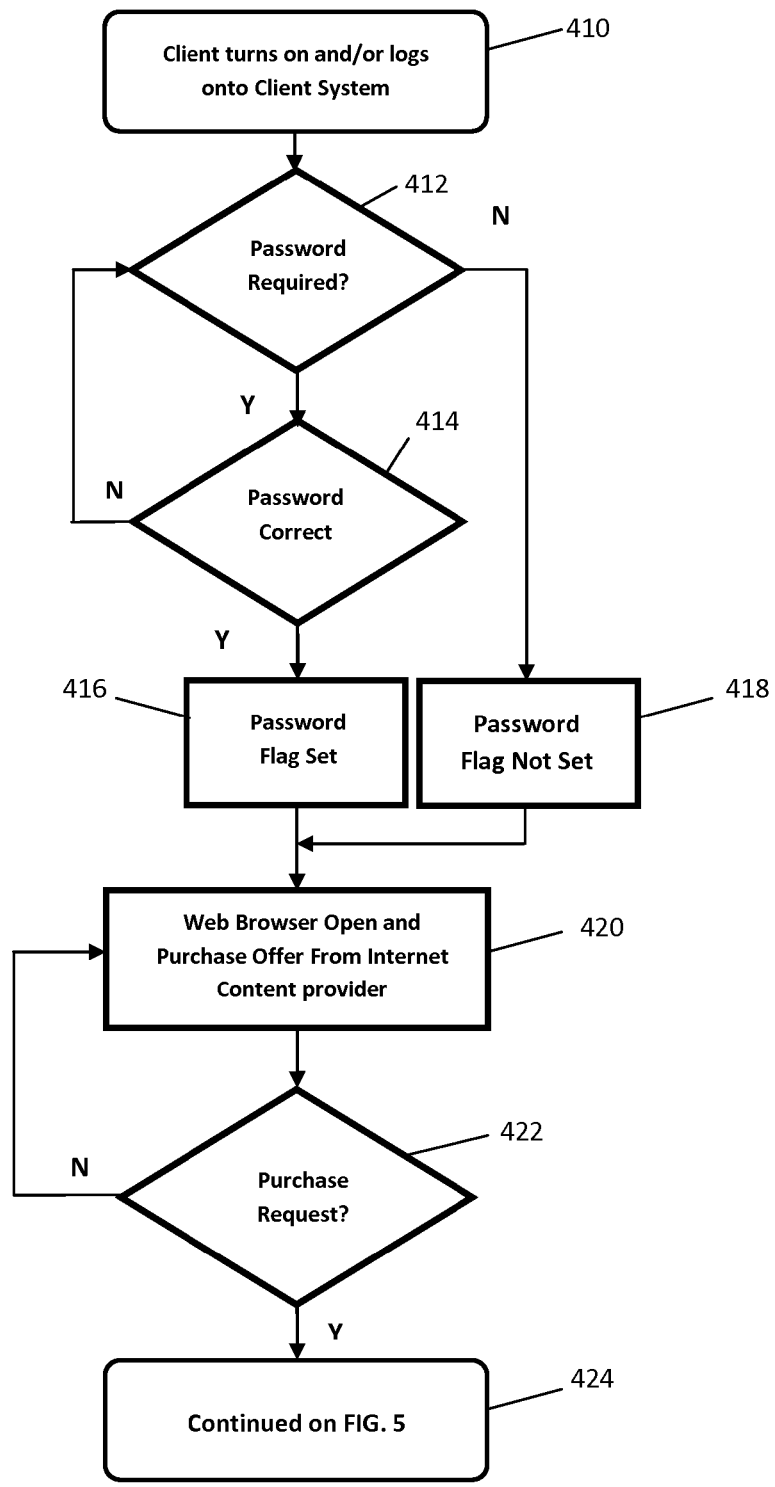
FIGS. 4-6 are a flowchart description of one method of effecting an electronic commerce transaction utilizing the internet.
Figure 5:
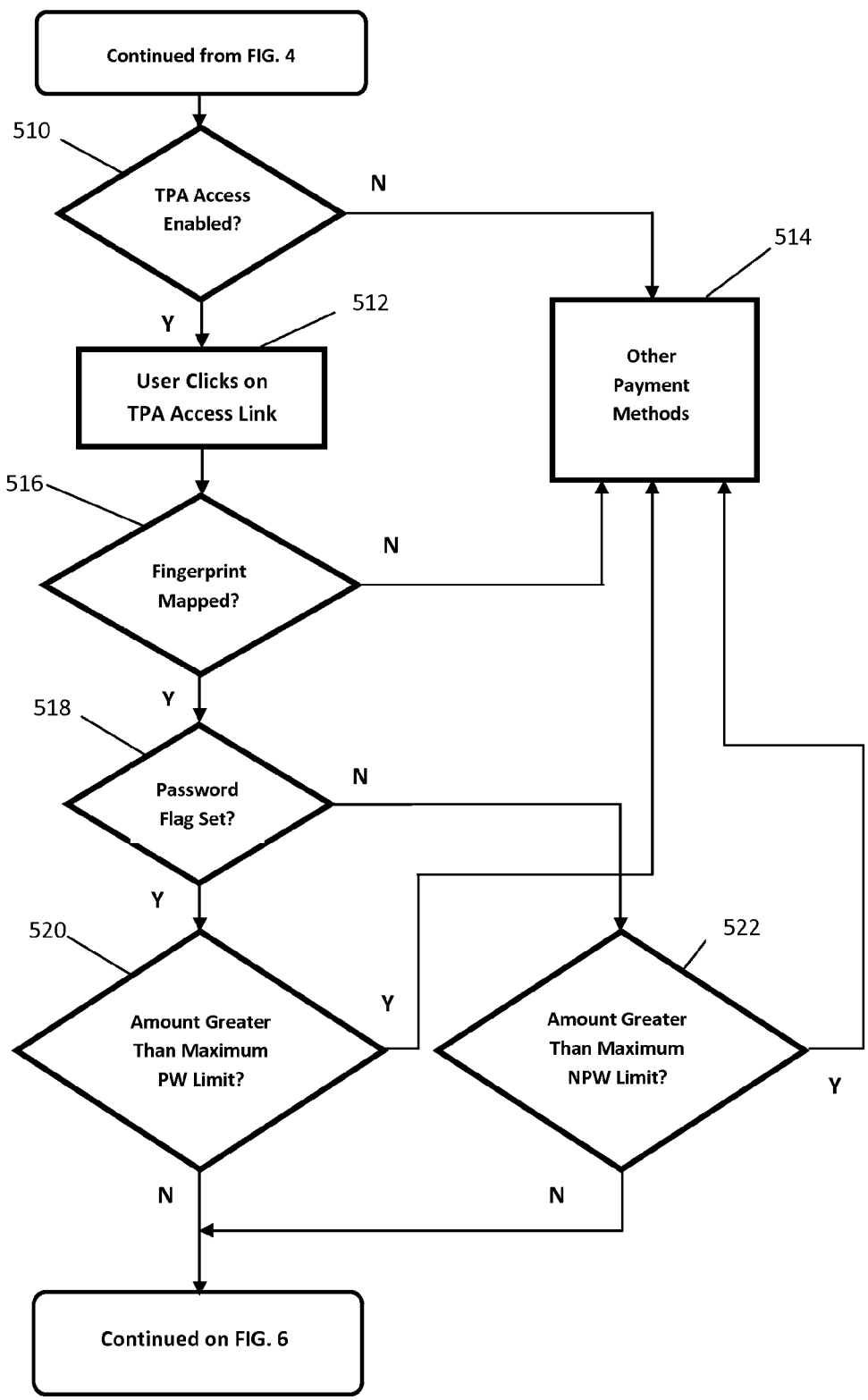
Figure 6:
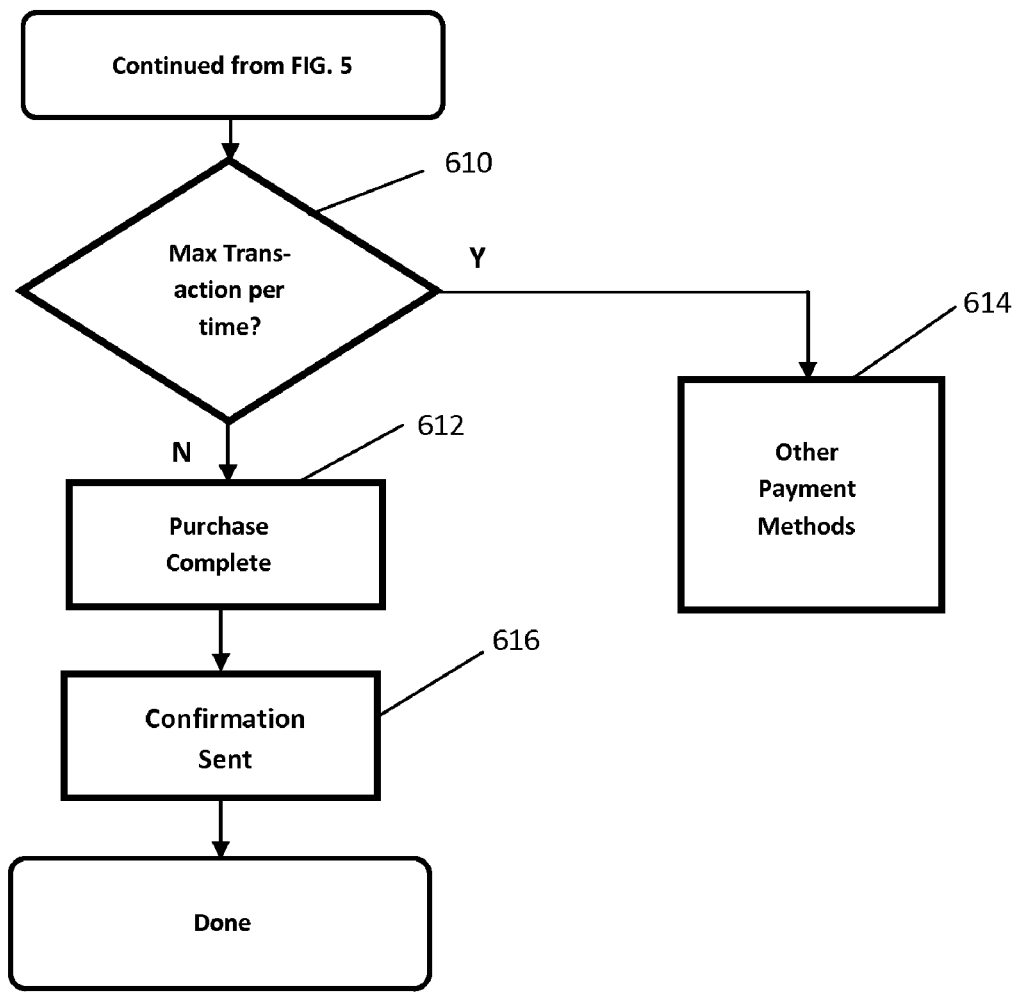

A payer using a client system registered with a TPA can practice a method and system of the invention according to an illustrated embodiment as described in the flowchart of FIGS. 4-6. As shown in FIG. 4, a payer/client turns on or otherwise logs on his or her client system, such as a home computer, a laptop, or other computing device, including mobile devices. If necessary or desired, the payer/client uses a log on password to access and log onto the client system 410. Examples of such passwords are passwords to run Microsoft® Windows® software, passwords to run Novell® software, and the like. If a password is required, the client system can prompt for a password 412, and if the password entered is correct 414, a password flag can be set on the client system 416. If a password is not required a password flag is not set on the client system 418.

The payer/client can use a web browser such as Microsoft Explorer® to access websites on the internet, including merchant websites on which goods and/or services are offered for sale 420. An online merchant internet content provider can display as part of its online information an offer for sale of goods or services, and an offer amount. The offer amount can be a fixed amount, or can be a dynamic amount, such as in an auction context. The online merchant internet content provider can provide a clickable link for a payer/client, or other reader, to click on, the link being a button, radio button, HTML hyperlink, or other of any known clickable graphic devices which a payer desiring to accept the online offer can click. "Clickable" is used in its ordinary, contemporary meaning as is well known to users of internet content, and refers to a type of device, such as a graphical user interface device, displayed on a client system screen, and which a payer or reader can click on by one or more clicks of a mouse, pointing device, touchpad, or the like. Thus, a user can single click, double click, left click, right click, or tap a touch pad, or the like to click a clickable link provided for the purpose of initiating a purchase transaction.

The payer/client can request to make a purchase by indicating such desire in any known manner, such as by clicking on a clickable link, such as a "buy it now" button, or an "add to cart" button, or the like 422. Clicking on the clickable link can link to the TPA, sending to the TPA by known methods relevant information such as the internet content provider's identity and the offer amount (or purchase amount), at which time computer executable instructions As further shown in FIG. 5, when a payer/client is ready to complete a purchase, if the merchant/payee has enabled TPA access such that a TPA service is enabled 510 and there is a clickable link provided, a purchaser for goods or services can click on a TPA access link 512. To the payer, clicking on the TPA access link is akin to clicking on Amazon.com's "Buy now with 1-click®" button in the sense that the remainder of the method and system can be largely, if not completely, transparent to the payer, and no further action may be required to complete the purchase of goods or services. Specifically, upon successful recognition by the TPA of the client system's device fingerprint, and if used, all other controls are satisfied, no other credentials are required from the payer/client at the time of purchase. That is, no more credentials such as passwords, PINS, unique codes, or other security devices need be utilized. In this manner, relatively easy and fast transactions can take place from any enabled internet content provider's online information, thus providing for a universal one-click feature on the internet. If TPA access is not enabled, the payer/client can complete a financial transaction using other payment methods 514, such as PayPal® or ordinary checkout with credit card data entry.

Once the TPA-registered payer/client clicks on the merchant's TPA access button, the client system communicates with the TPA system in a handshake in which the TPA identifies the client system device fingerprint and associates it with mapped payer data. For example, the TPA can recognize the client system by its device fingerprint and correlate the mapped payment account associated with the client system. If the device fingerprint is not mapped the payer/client can complete a financial transaction using other payment methods 514, such as PayPal® or ordinary checkout with credit card data entry. If the client system device fingerprint is mapped 516, the TPA can check if the client system password flag is set 518.

In one embodiment, the password set flag can be used as a control on purchasing options, such as a control on the maximum amount per purchase, or other limiting control, as set by the payer/client during registration and setup with the TPA. If used, for example, the TPA can query the password flag set and if the password flag is set check to see if the purchase amount attempting to be approved is greater than the limit for a correct password at client system start up 520, and, if the password flag is not set, check to see if the purchase amount attempting to be approved is greater than the limit for no password entered at client system start up 522. In other words, a password entry upon client system startup can serve as an additional control to mitigate risk of unauthorized purchases being made on a payer's client system.

As shown in FIG. 6, the method and system of the invention can include a step of ensuring that the attempted purchase does not result in a cumulative amount per a set time period that exceeds a payer-specified maximum limit for purchases in the set time period 610. For example, the payer/client can, upon registration with a TPA, specify that the TPA not facilitate purchase amounts that total cumulatively greater than $50.00 per any 24 hour period. If the payment amount exceeds such a payer-specified limit, the payer/client can complete a financial transaction using other payment methods 614, which can be the same methods as previously indicated in FIG. 5 as 514, such as PayPal® or ordinary checkout with credit card data entry.

Once all controls have been satisfied, the TPA can facilitate by known means of electronic funds transfer completion of the purchase transaction 612. The payer's payment account as registered with the TPA can be debited such that funds can be withdrawn from the payer's payment account and deposited into the payees receiving account as registered with the TPA.

The amount of monetary funds debited and deposited can be at least the offer amount, and can include taxes or fees. In one embodiment, the offer amount can be debited from a payer's payment account, and an amount less than the offer amount can be credited to, or deposited in, an internet content provider's receiving account, with the difference representing fee(s) charged by the TPA, and/or credit agencies.

As an additional risk mitigating control, the TPA can send a confirmation of the transaction to the payer's communication device of choice 616. For example, the TPA can confirm transaction completion with an email to a payer's email account. Likewise, the TPA can send a Twitter® message to either the payer's client system or to a payer's cell phone. Likewise, the TPA can send a confirmation message as a text message to a payer's cell phone. In this manner, any use, including unauthorized use, of the payer's client system can be detected and the payer can act accordingly. In particular, if unauthorized use is made of a payer's client system the payer can receive notification even if he or she does not have immediate access to the client system.

In one embodiment, the method and system of the invention can include a feature in which a payer can easily and quickly stop further activity on his or her client system. For example, if an unauthorized use of the payer's client system occurs, the TPA can send a text message of purchase completion to the payer's cell phone, and the text message can contain a phone number, a link, a reply address, or the like, for which the payer can easily call, link or reply to instruct the TPA to stop all further transactions until notified.

Other variations and modifications can be included in the method and system of the present invention. For example, for added security, and in the event that two client systems registered with the TPA have identical device fingerprints, an additional confirmation step can occur after the TPA checks if a client system's device fingerprint is matched, i.e., at 516 of FIG. 5. In such an event, computer executable instructions from the TPA server can query the user of the client system for a password, PIN, or other identifier and receive back a correct entry before continuing with the purchase transaction.

Another embodiment of the invention can include opportunity for further monetization of internet activity by providing a reverse payment scheme in which an internet content provider can utilize the services of a TPA to transfer funds into the account of a payer. In one embodiment, the internet content provider can transfer funds to a payer upon a payer-initiated site visit from a contact of the payer. For example, after a payer completes a transaction to have a comment rendered distinctive, the payer can be prompted to send, and send, to specified contacts, such as by email or Twitter® a message encouraging the contact to visit the internet content provider's website. In one embodiment, the payer, after paying for a comment to be made distinctive, can choose to activate a send feature from the internet content provider's website, to send messages to contacts with a message like "Hey, I just left a comment; check it out!" or "You won't believe what people are saying here!" with a hyperlink to the internet content provider's website. Upon each visit by a contact of the payer, which can be authenticated by means known in the art, such as providing an appropriate URL or an embedded code, the Internet content provider can authorize, via the TPA, for funds to be deposited in the payer's account.

In one embodiment, a payer, after paying for goods or services, or after paying for a comment to be made distinctive, can be prompted with the choice, such as by a clickable button and appropriate questions, to send a message to friends, family, or other contacts, encouraging them to visit the online merchant from whom a purchase was made. The message, which can be sent by any electronic means such as by email or SMS text, can be payer-generated or provided by the online merchant. The message includes an HTML hyperlink to the online merchant or internet content provider which is unique to the payer and recognized by the internet content provider as being provided by the payer. The unique URL can go to a landing page on the internet content provider's website, which landing page can be automatically re-directed to the page of choice, such as a news/comment page referred to by the payer in his message to contacts. In this manner, the internet content provider recognizes the URL as having been assigned to the payer, and can initiate a transfer of funds to the payer's account.

In another embodiment an internet content provider can provide no opportunity for free comments, but only paid comments. In such a system, the method of the present invention can be modified such that distinctiveness or position is determined by the amount paid relative to other commenter's amounts. Thus, as each commenter must pay to have his or her comment posted, those who pay more can have their comments posted nearer the top of the list, or with more distinctive visual features. In such an embodiment, rather than providing a "free" default format, the internet content can provide a "non-free" or "paid" default format. In one embodiment the internet content provider can require a base, or minimum, fee for posting in a default format, such as chronological order, and any payment over and above the base fee is considered the payment for distinctiveness, as disclosed herein.

While the invention has been described in detail, many other of various known features and methods, equipment, components, and techniques of online, internet-based systems and methods could be utilized with the present invention, such as reverse auction techniques, bid pooling, participant information gathering, use of virtual private networks (as distinct from a public internet), "one click" and "buy it now" features, dynamic and/or streaming pricing information, multiple participant transactional systems, secure information and data transmission, evolving dialog boxes, monitoring and notification of irregular network activity, prioritization of third party access to online sites, incentivizing comment reviews, and secure credit payment, to name some non-limiting examples. Therefore, the following patents and/or applications are hereby incorporated by reference herein, together with the above-mentioned U.S. Ser. No. 11/197,067, for their enabling teaching on various aspects and features of internet-based systems and methods, including those which could be incorporated to enhance the system and method of the present invention, but which for conciseness are not literally reproduced in full herein: U.S. Ser. No. 10/988,274, filed Nov. 11, 2004, entitled System and Method for Blog Functionality; U.S. Ser. No. 11/540,716, filed Oct. 2, 2006, entitled Method and Apparatus for Publishing Content Through Blog; U.S. Ser. No. 10/879,528, filed Jun. 30, 2004, entitled Content Publishing Over Mobile Networks; U.S. Ser. No. 11/443,436, filed May 30, 2006, entitled Providing Rewards for Manual User Insertion of One or More Ads into a Document to be Made Available to Another User or Users, for Distribution of Such Documents, and/or For User Actions on Such Distributed Ads; U.S. Ser. No. 11/420,970, filed May 30, 2006, entitled User Distributed Search Results; U.S. Ser. No. 11/464,813, filed Aug. 15, 2006, entitled System and Method for Conducting an Electronic Message Forum; U.S. Ser. No. 11/351,257, filed Feb. 9, 2006, entitled Facilitation of Online Discussion; U.S. Ser. No. 11/846,183, filed Aug. 28, 2007, entitled System and Method for Enhanced Interaction; U.S. Ser. No. 11/925,964, filed Oct. 28, 2007, entitled Methods for Publishing Web Content; U.S. Ser. No. 11/604,949, filed Nov. 27, 2006, entitled System and Method for Peer-to-Peer Internet Communication; U.S. Ser. No. 10/988,274, filed Nov. 11, 2004, entitled System and Method for Blog Functionality; U.S. Ser. No. 11/086,501, filed Mar. 21, 2005, entitled System and Method for Notifying of the Posting of a Web Logging Message Via a Dispatch Communication; U.S. Pat. No. 6,202,051, filed Feb. 19, 1999, entitled Facilitating Internet Commerce Through Internetworked Auctions; U.S. Pat. No. 6,449,601, filed Dec. 30, 1998, entitled Distributed Live Auction; U.S. Pat. No. 7,024,376, filed Jun. 30, 2000, entitled Internet-based Auction Method; U.S. Pat. No. 6,665,649, filed Mar. 10, 2000, entitled Smooth End of Auction on the Internet; U.S. Pat. No. 6,044,363, filed Sep. 2, 1997, entitled Automatic Auction Method; U.S. Pat. No. 6,466,917, filed Mar. 9, 2000, entitled Method and Apparatus for Verifying the Identity of a Participant Within an On-line Auction Environment; U.S. Pat. No. 5,890,138, filed Mar. 30, 1999, entitled Computer Auction System; U.S. Pat. No. 5,835,896, filed Nov. 10, 1998, entitled Method and System for Processing and Transmitting Electronic Auction Information; U.S. Pat. No. 6,044,363, filed Mar. 28, 2000, Automatic Auction Method; U.S. Pat. No. 6,269,343, filed Jul. 31, 2001, entitled Online Marketing System and Method; U.S. Pat. No. 6,415,270, filed Jul. 2, 2002, entitled Interactive Remote Auction Bidding System; U.S. Pat. No. 6,449,601, filed Sep. 10, 2002, entitled Distributed Live Auction; U.S. Pat. No. 6,587,838, filed Jul. 1, 2003, entitled Method and System for Conducting Real Time Electronic Commerce; U.S. Pat. No. 6,671,674, filed Dec. 30, 2003, entitled Computer-based Auction and Sale System; U.S. Pat. No. 7,024,376, filed Apr. 4, 2006, entitled Internet-based Auction Method; U.S. Pat. No. 7,085,732, filed Aug. 1, 2006, entitled Online Trading for the Placement of Advertising Media; U.S. Pat. No. 7,162,446, filed Jan. 9, 2007, entitled Integrated Auction; U.S. Pat. No. 7,225,151, filed May 29, 2007, entitled Online Auction Bid Management System and Method; U.S. Pat. No. 7,249,055, filed Jul. 24, 2007, entitled Method and System for Managing and Conducting a Network Auction; U.S. Pat. No. 7,249,085, filed Jul. 24, 2007, entitled Method and System for Conducting Electronic Auctions with Multi-Parameter Price Equalization Bidding; U.S. Pat. No. 7,315,832, filed Jan. 1, 2008, entitled Online Bidding System; U.S. Pat. No. 7,403,915, filed Jul. 22, 2008, entitled Auction System and Method; U.S. Pat. No. 7,089,208, filed Apr. 28, 2000, entitled System and Method for Electronically Exchanging Value Among Distributed Users; U.S. Pat. No. 7,191,151, filed Aug. 23, 2001, entitled Instant Availability of Electronically Transferred Funds; U.S. Pat. No. 7,249,094, filed Feb. 26, 2001, entitled System and Method of Depicting On-Line Transactions; U.S. Pat. No. 7,430,537, filed Jul. 10, 2001, entitled System and Method for Verifying a Financial Instrument; U.S. Pat. No. 5,893,080, filed Apr. 6, 1999, entitled Disbursement System and Method; U.S. Pat. No. 5,963,647, filed Oct. 5, 1999, entitled Method and System for Transferring Funds from an Account to an Individual; U.S. Pat. No. 6,029,151, filed Feb. 22, 2000, entitled Method and System for Performing Electronic Money Transactions; U.S. Pat. No. 6,032,133, filed Feb. 29, 2000, entitled Electronic Bill Pay System; U.S. Pat. No. 6,223,168, filed Apr. 24, 2001, entitled Automatic Remittance Delivery System; U.S. Pat. No. 5,845,265, filed Nov. 7, 1995, entitled Consignment Nodes; U.S. Pat. No. 7,389,251, filed Oct. 21, 1999, entitled Computer-implemented Method for Managing Dynamic Pricing Information; U.S. Ser. No. 10/740,151, filed Dec. 17, 2003, entitled Consignment Nodes; U.S. Ser. No. 11/140,660, filed May 27, 2005, entitled Publication of Informational Messages to Software Applications in a Computing Environment; U.S. Ser. No. 11/888,784, filed Jul. 9, 2004, entitled Method and Apparatus for Securely Displaying and Communicating Trusted and Untrusted Internet Content; U.S. Pat. No. 6,058,417, filed Oct. 23, 1998, entitled, Information Presentation and Management in an Online Trading Environment; U.S. Pat. No. 6,466,917, filed Mar. 9, 2000, entitled, Method and Apparatus for Verifying the Identity of a Participant Within an On-Line Auction Environment; U.S. Pat. No. 7,139,916, filed Jun. 28, 2002, entitled Method and System for Monitoring User Interaction with a Computer; U.S. Pat. No. 7,305,469, filed Dec. 18, 2001, entitled Prioritization of Third Party Access to an Online Commerce Site; U.S. Pat. No. 7,369,505, filed Jun. 7, 2004, entitled, Method and System to Efficiently Manage Network Connection to Connect a Client and a Resource; U.S. Pat. No. 7,233,973, filed Mar. 28, 2005, entitled Evolving Interactive Dialog Box for an Internet Web Page; U.S. Pat. No. 6,944,599, filed Sep. 13, 2000, entitled Monitoring and Automatic Notification of Irregular Activity in a Network-Based Transaction Facility; U.S. Pat. No. 7,373,312, filed Dec. 4, 2000, entitled Method and Apparatus for Facilitating User Registration in an On-Line Auction Environment; U.S. Pat. No. 6,606,608, filed Jul. 19, 1999, entitled Method and System for Providing a Discount at an Auction; U.S. Pat. No. 6,549,904, filed Jun. 25, 1999, entitled Auction Notification System; U.S. Pat. No. 7,428,496, filed Jan. 27, 2006, entitled Creating an Incentive to Author Useful Item Reviews; and U.S. Pat. No. 6,324,526, filed Nov. 27, 2001, entitled System and Method for Performing Secure Credit Card Purchases.

What is claimed is:

1. A computer-implemented system for monetizing internet content, the system comprising:
   a. an internet content provider providing online information and an online comment section associated with said online information, said online comment section capable of having posted thereto reader comments in a free default format;
   b. computer executable instructions for performing steps comprising:
      i. displaying to a reader, who can leave a reader comment in response to said online information, an offer associated with said online information, said offer being an offer to alter a reader comment from said free default format to a distinctive format for a fee;
      ii. receiving by said internet content provider, from a reader of said online information, an acceptance of said offer;
      iii. altering said reader comment from said free default format; and
      iv. displaying said altered comment in said online comment section;
   c. a processor for executing said computer executable instructions; and
   d. a memory for storing at least said computer executable instructions.

2. The system of claim 1, wherein said internet content provider provides content via a website and said content is a news story or blog entry, and said comment section is disposed at the end of said news story or blog entry.

3. The system of claim 1, wherein said acceptance of said offer is received after said reader clicks on a designated link.

4. The system of claim 1, wherein said altered comment does not include an indication of a time of posting.

5. The system of claim 1, wherein said altering of said comment is upon payment facilitated by a third party administrator without manually-entered credentials selected from the group consisting of user name and password.

6. The system of claim 1, wherein said fee is fixed, and said comment is altered in a manner selected from the group consisting of, altered appearance and altered placement relative to other comments.

7. The system of claim 1, wherein said fee is dynamically adjustable, and said comment is altered relative to other comments having paid an equal or lesser fee in a manner selected from the group consisting of, altered appearance and altered placement.

8. A computer-implemented method for monetizing online internet content, the method comprising the steps of:
   a. publishing internet content online by an internet content provider;
   b. providing with said published content a section for posting reader comments;
   c. providing to a reader, who can leave a reader comment in response to said published content, an option of posting for free said reader comment as a default format comment or posting for a fee said reader comment made distinctive relative to a default format comment; and d. posting said reader's comment made distinctive relative to a default format, wherein said comment made distinctive does not include an indication of a time of posting.

9. The method of claim 8, wherein said internet content provider publishes content via a website and said content is a news story or blog entry, and said comment section is disposed at the end of said news story or blog entry.

10. The method of claim 8, wherein said fee is received in a receiving account associated with said internet content provider.

11. The method of claim 8, wherein said fee is received from a payment account of said reader, said payment account being selected from a credit card account, a debit card account, a PayPal® account, or combinations thereof.

12. The method of claim 8, wherein said fee is fixed, and said comment is altered in a manner selected from the group consisting of, altered appearance and altered placement relative to other comments.

13. The method of claim 8, wherein said fee is dynamically adjustable, and said comment is altered relative to other comments having paid an equal, greater, or lesser fee in a manner selected from the group consisting of, altered appearance and altered placement.

14. The method of claim 8, wherein said reader's comment is transformed from a first default tangible expression of content to a second distinctive tangible expression of content by computer machines.

* * * * *